US012739935B2

(12) United States Patent
Tseng et al.

(10) Patent No.: US 12,739,935 B2
(45) Date of Patent: Sep. 15, 2026

(54) METHOD AND USER EQUIPMENT OF SIDELINK DISCONTINUOUS RECEPTION

(71) Applicant: SHARP KABUSHIKI KAISHA, Sakai City (JP)

(72) Inventors: Yung-Lan Tseng, Taipei City (TW); Mei-Ju Shih, Taipei City (TW); Tzu-Wen Chang, Taipei City (TW)

(73) Assignee: SHARP KABUSHIKI KAISHA, Sakai City (JP)

( * ) Notice: Subject to any disclaimer, the term of this patent is extended or adjusted under 35 U.S.C. 154(b) by 383 days.

(21) Appl. No.: 18/300,370

(22) Filed: Apr. 13, 2023

(65) Prior Publication Data

US 2023/0337321 A1 Oct. 19, 2023

Related U.S. Application Data

(60) Provisional application No. 63/331,607, filed on Apr. 15, 2022.

(51) Int. Cl.
*H04W 76/28* (2018.01)
*H04W 92/18* (2009.01)

(52) U.S. Cl.
CPC ............ *H04W 76/28* (2018.02); *H04W 92/18* (2013.01)

(58) Field of Classification Search
CPC . H04W 76/28; H04W 92/18; H04W 52/0219; H04W 52/0229; H04W 52/028; H04W 76/14
See application file for complete search history.

(56) References Cited

U.S. PATENT DOCUMENTS

2022/0361283 A1* 11/2022 Liu .................... H04W 52/0235
2023/0014303 A1* 1/2023 Di Girolamo ........ H04W 76/28
2023/0040436 A1* 2/2023 Cheng ............... H04W 52/0216
2023/0247553 A1* 8/2023 Zheng .................. H04W 76/28 370/311
2023/0309016 A1* 9/2023 Li ......................... H04W 76/14
2024/0324061 A1* 9/2024 Yang ..................... H04W 76/28
2025/0024546 A1* 1/2025 Back ..................... H04W 76/14

OTHER PUBLICATIONS

LG Electronics Inc, “CR of TS 38.321 for Sidelink enhancement”, 3GPP TSG-RAN WG2 Meeting #117 Electronic, R2-2202948, Feb. 2022, p. 1-28.

(Continued)

*Primary Examiner* — Steven Hieu D Nguyen
(74) *Attorney, Agent, or Firm* — ScienBiziP, P.C.

(57) ABSTRACT

Methods and user equipment of sidelink discontinuous reception (SL-DRX) are provided. The method includes: rejecting a SL-DRX configuration of a sidelink service by transmitting one of a first signaling and a second signaling with a sidelink destination identity to a serving cell of the first UE according to a cast type of the sidelink service, wherein the sidelink destination identity is associated with the sidelink service and the SL-DRX configuration is configured by the serving cell; and in response to rejecting the SL-DRX configuration, disabling a SL-DRX mechanism for the sidelink service and the sidelink destination identity.

11 Claims, 4 Drawing Sheets

(56) References Cited

OTHER PUBLICATIONS

3GPP, "3rd Generation Partnership Project; Technical Specification Group Radio Access Network; NR; Physical layer procedures for data (Release 17)", 3GPP TS 38.214 V17.1.0, Mar. 2022, pp. 1-225.
3GPP, "3rd Generation Partnership Project; Technical Specification Group Radio Access Network; NR; Medium Access Control (MAC) protocol specification (Release 17)", 3GPP TS 38.321 V17.0.0, Mar. 2022, pp. 1-221.
3GPP, "3rd Generation Partnership Project; Technical Specification Group Radio Access Network; NR; Physical layer procedures for control(Release 17)", 3GPP TS 38.213 V17.1.0, Mar. 2022, pp. 1-245.
3GPP, "3rd Generation Partnership Project; Technical Specification Group Radio Access Network; NR; Radio Resource Control (RRC) protocol specification (Release 16)", 3GPP TS 38.331 V16.8.0, Mar. 2022, pp. 1-964.
3GPP, "3rd Generation Partnership Project; Technical Specification Group Radio Access Network; Evolved Universal Terrestrial Radio Access (E-UTRA); Radio Resource Control (RRC); Protocol specification (Release 16)", 3GPP TS 36.331 V16.8.0, Mar. 2022, pp. 1-1092.
3GPP, "3rd Generation Partnership Project; Technical Specification Group Radio Access Network; NR; Physical layer measurements (Release 17)", 3GPP TS 38.215 V17.1.0, Mar. 2022, pp. 1-26.
3GPP, "3rd Generation Partnership Project; Technical Specification Group Radio Access Network; NR; Multiplexing and channel coding (Release 17)", 3GPP TS 38.212 V17.1.0, Mar. 2022, pp. 1-197.
3GPP, "3rd Generation Partnership Project; Technical Specification Group Services and System Aspects; Architecture enhancements for 5G System (5GS) to support Vehicle-to-Everything (V2X) services (Release 17)", 3GPP TS 23.287 V17.2.0, Dec. 2021, pp. 1-60.

* cited by examiner

METHOD AND USER EQUIPMENT OF SIDELINK DISCONTINUOUS RECEPTION

CROSS-REFERENCE TO RELATED APPLICATION(S)

The present application claims the benefit of and priority to U.S. Provisional Patent Application Ser. No. 63/331,607, filed on Apr. 15, 2022, entitled "ENHANCEMENTS FOR SIDELINK DISCONTINUOUS RECEPTION OPERATION", the content of which is hereby incorporated fully by reference herein into the present disclosure.

FIELD

The present disclosure generally relates to wireless communications, and more particularly, to methods and a user equipment (UE) of sidelink discontinuous reception (SL-DRX).

BACKGROUND

With the tremendous growth in the number of connected devices and the rapid increase in user/network traffic volume, various efforts have been made to improve different aspects of wireless communication for the next-generation wireless communication system, such as the fifth generation (5G) New Radio (NR), by improving data rate, latency, reliability, and mobility. The 5G NR system is designed to provide flexibility and configurability to optimize the network services and types, accommodating various use cases, such as enhanced Mobile Broadband (eMBB), massive Machine-Type Communication (mMTC), and Ultra-Reliable and Low-Latency Communication (URLLC).

For a sidelink service, a UE may receive the sidelink service by performing a SL-DRX operation. The implementation of the SL-DRX mechanism may be impacted by some factors associated with, for example, a handover procedure, a sidelink resource allocation mechanism or multiple carriers support for sidelink. For example, the sidelink resource allocation mechanism may be associated with Mode 1/Mode 2 sidelink resource allocation mechanism, sidelink exceptional pool configuration, or Type 1/Type 2 sidelink configured grant configuration. The sidelink frequency carriers supported by the sidelink UEs and the sidelink frequency carriers supported by the serving cells may be different. In addition, the sidelink frequency carrier may correspond to a serving frequency associated with the serving cell (or primary cell) or a non-serving frequency. A specific sidelink service may be implemented on different sidelink frequency carriers.

As such, it is important to provide mechanisms of the SL-DRX operation for the scenarios mentioned above.

SUMMARY

The present disclosure is directed to a method, a UE, and a BS of SL-DRX.

The present disclosure provides a method of sidelink discontinuous reception (SL-DRX), adapted to a first user equipment (UE), wherein the method including: rejecting a SL-DRX configuration of a sidelink service by transmitting one of a first signaling and a second signaling with a sidelink destination identity to a serving cell of the first UE according to a cast type of the sidelink service, wherein the sidelink destination identity is associated with the sidelink service and the SL-DRX configuration is configured by the serving cell; and in response to rejecting the SL-DRX configuration, disabling a SL-DRX mechanism for the sidelink service and the sidelink destination identity.

In one embodiment, the step of transmitting the one of the first signaling and the second signaling including: transmitting the first signaling to the serving cell in response to the cast type being a sidelink unicast service.

In one embodiment, the method further including: transmitting a sidelink control signaling to a second UE via a PC5 radio resource control (RRC) connection between the first UE and the second UE; receiving an SL-DRX reject message from the second UE after transmitting the sidelink control signaling; and transmitting the first signaling to the serving cell after receiving the SL-DRX reject message.

In one embodiment, the SL-DRX reject message includes a RRCReconfigurationCompletesidelink message, wherein the sidelink control signaling includes a RRCReconfigurationsidelink message.

In one embodiment, the first signaling includes a SL-DRX reject indication indicating a sidelink failure event for the PC5 RRC connection between the first UE and the second UE.

In one embodiment, the step of transmitting the one of the first signaling and the second signaling including: transmitting the second signaling to the serving cell in response to the cast type being a sidelink groupcast service.

In one embodiment, the second signaling includes a SL-DRX indication indicating the SL-DRX mechanism is not applied for the sidelink destination identity.

In one embodiment, the method further including: receiving the SL-DRX configuration via one of broadcasting system information and a UE-specific dedicated control signaling in response to the cast type being a sidelink groupcast service; and applying the SL-DRX configuration to a plurality of sidelink groupcast services implemented by the first UE.

In one embodiment, the method further including:receiving the SL-DRX configuration via a UE-specific dedicated control signaling in response to the cast type being a sidelink unicast type.

The present disclosure provides a first user equipment (UE), including: one or more non-transitory computer-readable media having computer-executable instructions embodied thereon; and at least one processor coupled to the one or more non-transitory computer-readable media, and configured to execute the computer-executable instructions to: reject a SL-DRX configuration of a sidelink service by transmitting one of a first signaling and a second signaling with a sidelink destination identity to a serving cell of the first UE according to a cast type of the sidelink service, wherein the sidelink destination identity is associated with the sidelink service and the SL-DRX configuration is configured by the serving cell; and determining a SL-DRX mechanism is not applied for the sidelink service and the sidelink destination identity.

In one embodiment, the at least one processor is further configured to execute the computer-executable instructions to: transmit the first signaling to the serving cell in response to the cast type being a sidelink unicast service.

In one embodiment, the at least one processor is further configured to execute the computer-executable instructions to: transmit a sidelink control signaling to a second UE via a PC5 radio resource control (RRC) connection between the first UE and the second UE; receiving an SL-DRX reject message from the second UE after transmitting the sidelink control signaling; and transmitting the first signaling to the serving cell after receiving the SL-DRX reject message.

In one embodiment, the SL-DRX reject message comprises a RRCReconfigurationCompletesidelink message, wherein the sidelink control signaling comprises a RRCReconfigurationsidelink message.

In one embodiment, the first signaling comprises a SL-DRX reject indication indicating a sidelink failure event for the PC5 RRC connection between the first UE and the second UE.

In one embodiment, the at least one processor is further configured to execute the computer-executable instructions to: transmit the second signaling to the serving cell in response to the cast type being a sidelink groupcast service.

In one embodiment, the second signaling comprises a SL-DRX indication indicating the SL-DRX mechanism is not applied for the sidelink destination identity.

In one embodiment, the at least one processor is further configured to execute the computer-executable instructions to: receive the SL-DRX configuration via one of broadcasting system information and a UE-specific dedicated control signaling in response to the cast type being a sidelink groupcast service; and apply the SL-DRX configuration to a plurality of sidelink groupcast services implemented by the first UE.

In one embodiment, the at least one processor is further configured to execute the computer-executable instructions to: receive the SL-DRX configuration via a UE-specific dedicated control signaling in response to the cast type being a sidelink unicast type.

The present disclosure provides a method of sidelink discontinuous reception (SL-DRX), adapted toa a base station, wherein the method including: receiving a rejection of a sidelink service via one of a first signaling and a second signaling from a user equipment (UE), wherein the one of the first signaling and the second signaling is determined according to a cast type of the sidelink service; and in response to receiving the rejection, disabling a SL-DRX mechanism for the sidelink service.

In view of foregoing, the present disclosure provides designs for the SL-DRX reject message transmission. A UE of a sidelink service may reject one or more DL-DRX configurations through different signalings according to the cast type of the sidelink service. For the sidelink unicast service, the UE may reject the SL-DRX configuration via a signaling such as a RRCReconfigurationCompletesidelink message. Since no new signaling is used for rejecting the SL-DRX DRX configuration, the overhead between the UE and the serving cell may be reduced.

BRIEF DESCRIPTION OF THE DRAWINGS

Aspects of the exemplary disclosure are best understood from the following detailed description when read with the accompanying figures. Various features are not drawn to scale, and dimensions of various features may be arbitrarily increased or reduced for clarity of discussion.

DETAILED DESCRIPTION

Figure 1:
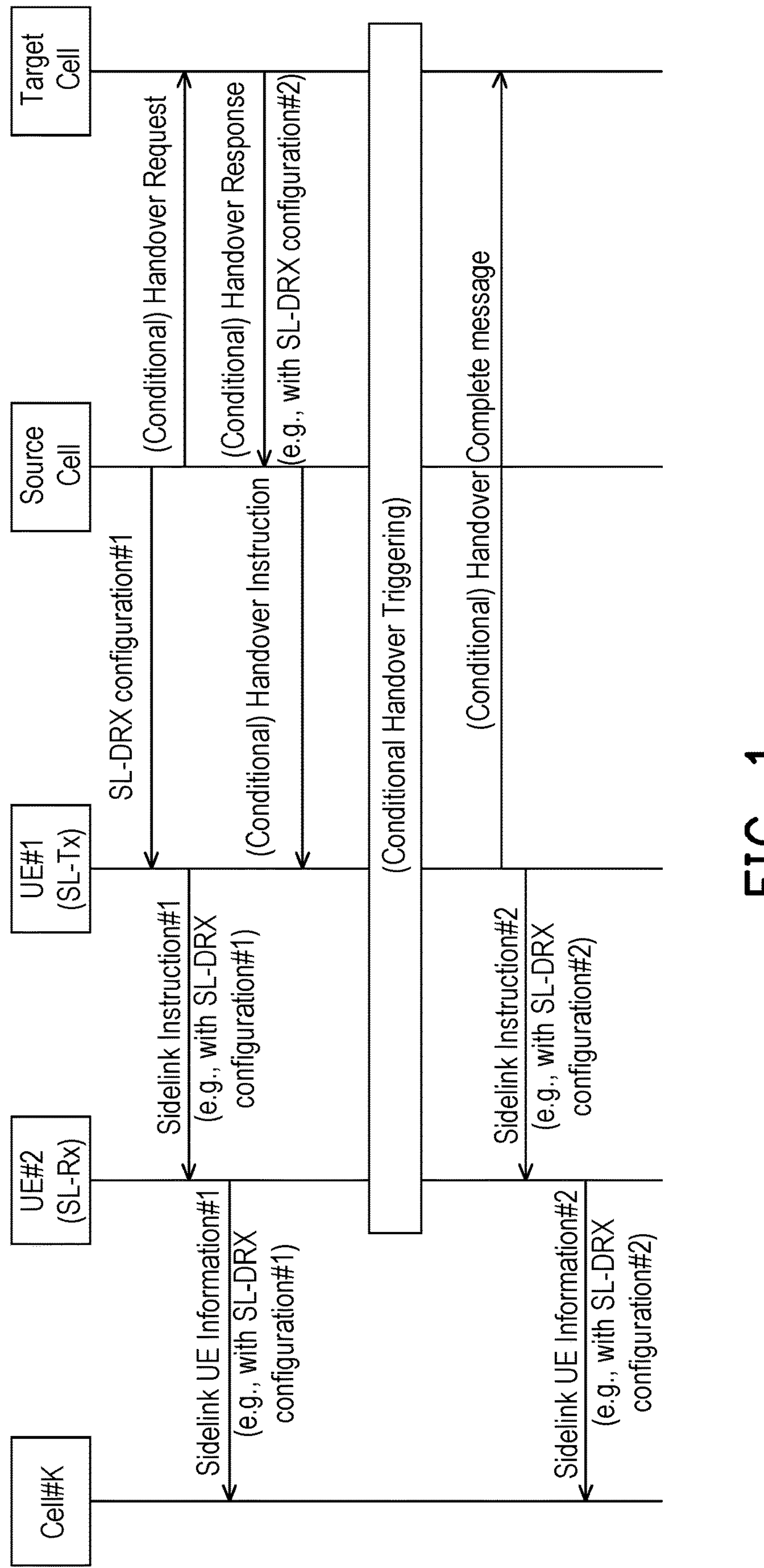
FIG. 1 is a schematic diagram illustrating a signaling flow of SL-DRX mechanism during a (conditional) handover procedure according to one embodiment of the present disclosure.

The acronyms in the present disclosure are defined as follows and unless otherwise specified, the acronyms have the following meanings:

Acronym Full name
3GPP 3$^{rd}$ Generation Partnership Project
5GC 5G Core
ACK Acknowledgement
ARQ Automatic Repeat Request
BS Base Station
BWP Bandwidth Part
CA Carrier Aggregation
CN Core Network
CORESET Control Resource Set
C-RNTI Cell-Radio Network Temporary Identifier
DC Dual Connectivity
DCI Downlink Control Information
DL Downlink
HARQ Hybrid Automatic Repeat Request
IE Information Element
MAC Medium Access Control
MCG Master Cell Group
MIMO Multiple Input Multiple Output
NG-RAN Next-Generation Radio Access Network
NR New Radio
NW Network
PCell Primary Cell
PDCCH Physical Downlink Control Channel
PDCP Packet Data Convergence Protocol
PDSCH Physical Downlink Shared Channel
PDU Protocol Data Unit
PHY Physical Layer
PRACH Physical Random Access Channel
PUCCH Physical Uplink Control Channel
PUSCH Physical Uplink Shared Channel
QoS Quality of Service
RA Random Access
RACH Random Access Channel
RAN Radio Access Network
Rel Release
RLC Radio Link Control
RNTI Radio Network Temporary Identifier
RRC Radio Resource Control
RSRP Reference Signal Received Power
SCell Secondary Cell
SCG Secondary Cell Group
SCS Sub Carrier Spacing
SDAP Service Data Adaptation Protocol
SDU Service Data Unit
SFN System Frame Number
SI System Information
SIB System Information Block
TB Transport Block
TS Technical Specification
UCI Uplink Control Information
UE User Equipment
UL Uplink The following description contains specific information pertaining to example implementations in the present disclosure. The drawings in the present disclosure and their accompanying detailed description are directed to merely example implementations. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale and are not intended to correspond to actual relative dimensions.

For the purpose of consistency and ease of understanding, like features may be identified (although, in some examples, not shown) by the same numerals in the example figures. However, the features in different implementations may be differed in other respects, and thus shall not be narrowly confined to what is shown in the figures.

The description uses the phrases "in one implementation," or "in some implementations," which may each refer to one or more of the same or different implementations. The term "coupled" is defined as connected, whether directly or indirectly through intervening components, and is not necessarily limited to physical connections. The term "comprising," when utilized, means "including, but not necessarily limited to", which specifically indicates open-ended inclusion or membership in the so-described combination, group, series and the equivalent. The expression "at least one of A, B and C" or "at least one of the following: A, B and C" means "only A, or only B, or only C, or any combination of A, B and C."

Any sentence, paragraph, (sub)-bullet, point, action, behavior, term, alternative, aspect, example, or claim described in the present disclosure may be combined logically, reasonably, and properly to form a specific method. Any sentence, paragraph, (sub)-bullet, point, action, behavior, term, alternative, aspect, example, or claim described in the present disclosure may be implemented independently and separately to form a specific method. Dependency, e.g., "based on", "more specifically", "in some implementations", "in one alternative", "in one example", "in one aspect", or etc., in the present disclosure is just one possible example in which would not restrict the specific method. One aspect of the present disclosure may be used, for example, in a communication, communication equipment (e.g., a mobile telephone apparatus, ad base station apparatus, a wireless LAN apparatus, and/or a sensor device, etc.), and integrated circuit (e.g., a communication chip) and/or a program, etc. According to any sentence, paragraph, (sub)-bullet, point, action, behavior, term, alternative, aspect, example, implementation, or claim described in the present disclosure, "X/Y" may include the meaning of "X or Y". According to any sentence, paragraph, (sub)-bullet, point, action, behavior, term, alternative, aspect, example, implementation, or claim described in the present disclosure, "X/Y" may also include the meaning of "X and Y". According to any sentence, paragraph, (sub)-bullet, point, action, behavior, term, alternative, aspect, example, implementation, or claim described in the present disclosure, "X/Y" may also include the meaning of "X and/or Y".

Additionally, for the purposes of explanation and non-limitation, specific details, such as functional entities, techniques, protocols, standard, and the like are set forth for providing an understanding of the described technology. In other examples, detailed description of well-known methods, technologies, systems, architectures, and the like are omitted so as not to obscure the description with unnecessary details.

Persons skilled in the art will immediately recognize that any network function(s) or algorithm(s) described in the present disclosure may be implemented by hardware, software or a combination of software and hardware. Described functions may correspond to modules which may be software, hardware, firmware, or any combination thereof. The software implementation may comprise computer executable instructions stored on computer readable medium such as memory or other type of storage devices. For example, one or more microprocessors or general-purpose computers with communication processing capability may be programmed with corresponding executable instructions and carry out the described network function(s) or algorithm(s). The microprocessors or general-purpose computers may be formed of Applications Specific Integrated Circuitry (ASIC), programmable logic arrays, and/or using one or more Digital Signal Processor (DSPs). Although some of the example implementations described in this specification are oriented to software installed and executing on computer hardware, nevertheless, alternative example implementations implemented as firmware or as hardware or combination of hardware and software are well within the scope of the present disclosure.

The computer readable medium includes but is not limited to Random Access Memory (RAM), Read Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture (e.g., a Long Term Evolution (LTE) system, an LTE-Advanced (LTE-A) system, an LTE-Advanced Pro system, or a 5G NR Radio Access Network (RAN)) typically includes at least one base station, at least one UE, and one or more optional network elements that provide connection towards a network. The UE communicates with the network (e.g., a Core Network (CN), an Evolved Packet Core (EPC) network, an Evolved Universal Terrestrial Radio Access network (E-UTRAN), a 5G Core (5GC), or an internet), through a RAN established by one or more base stations.

It should be noted that, in the present disclosure, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, a vehicle, or a Personal Digital Assistant (PDA) with wireless communication capability. The UE is configured to receive and transmit signals over an air interface to one or more cells in a radio access network.

A base station may be configured to provide communication services according to at least one of the following Radio Access Technologies (RATs): Worldwide Interoperability for Microwave Access (WiMAX), Global System for Mobile communications (GSM, often referred to as 2G), GSM Enhanced Data rates for GSM Evolution (EDGE) Radio Access Network (GERAN), General Packet Radio Service (GPRS), Universal Mobile Telecommunication System (UMTS, often referred to as 3G) based on basic wideband-code division multiple access (W-CDMA), high-speed packet access (HSPA), LTE, LTE-A, eLTE (evolved LTE, e.g., LTE connected to 5GC), NR (often referred to as 5G), and/or LTE-A Pro. However, the scope of the present disclosure should not be limited to the above-mentioned protocols.

A base station may include, but is not limited to, a node B (NB) as in the UMTS, an evolved node B (eNB) as in the LTE or LTE-A, a radio network controller (RNC) as in the UMTS, a base station controller (BSC) as in the GSM/GSM Enhanced Data rates for GSM Evolution (EDGE) Radio Access Network (GERAN), a next-generation eNB (ng-eNB) as in an Evolved Universal Terrestrial Radio Access (E-UTRA) BS in connection with the 5GC, a next-generation Node B (gNB) as in the 5G Access Network (5G-AN), and any other apparatus capable of controlling radio communication and managing radio resources within a cell. The BS may connect to serve the one or more UEs through a radio interface to the network.

The base station may be operable to provide radio coverage to a specific geographical area using a plurality of cells included in the RAN. The BS may support the operations of the cells. Each cell may be operable to provide services to at least one UE within its radio coverage. Specifically, each cell (often referred to as a serving cell) may provide services to serve one or more UEs within its radio coverage (e.g., each cell schedules the Downlink (DL) and optionally Uplink (UL) resources to at least one UE within its radio coverage for DL and optionally UL packet transmission). The BS may communicate with one or more UEs in the radio communication system through the plurality of cells.

A cell may allocate sidelink (SL) resources for supporting Proximity Service (ProSe) or Vehicle to Everything (V2X) services. Each cell may have overlapped coverage areas with other cells. In Multi-RAT Dual Connectivity (MR-DC) cases, the primary cell of a Master Cell Group (MCG) or a Secondary Cell Group (SCG) may be referred to as a Special Cell (SpCell). A Primary Cell (PCell) may refer to the SpCell of an MCG. A Primary SCG Cell (PSCell) may refer to the SpCell of an SCG. MCG may refer to a group of serving cells associated with the Master Node (MN), including the SpCell and optionally one or more Secondary Cells (SCells). An SCG may refer to a group of serving cells associated with the Secondary Node (SN), including the SpCell and optionally one or more SCells.

As discussed above, the frame structure for NR is to support flexible configurations for accommodating various next generation (e.g., 5G) communication requirements, such as Enhanced Mobile Broadband (eMBB), Massive Machine Type Communication (mMTC), Ultra-Reliable and Low-Latency Communication (URLLC), while fulfilling high reliability, high data rate and low latency requirements. The Orthogonal Frequency-Division Multiplexing (OFDM) technology as agreed in 3GPP may serve as a baseline for NR waveform. The scalable OFDM numerology, such as the adaptive sub-carrier spacing, the channel bandwidth, and the Cyclic Prefix (CP) may also be used. Additionally, two coding schemes are considered for NR: (1) Low-Density Parity-Check (LDPC) code and (2) Polar Code. The coding scheme adaption may be configured based on the channel conditions and/or the service applications.

Moreover, it is also considered that in a transmission time interval TX of a single NR frame, a downlink (DL) transmission data, a guard period, and an uplink (UL) transmission data should at least be included, where the respective portions of the DL transmission data, the guard period, the UL transmission data should also be configurable, for example, based on the network dynamics of NR. In addition, sidelink resources may also be provided in an NR frame to support ProSe services, (E-UTRA/NR) sidelink services, or (E-UTRA/NR) V2X services.

In addition, the terms "system" and "network" herein may be used interchangeably. The term "and/or" herein is only an association relationship for describing associated objects, and represents that three relationships may exist. For example, A and/or B may indicate that: A exists alone, A and B exist at the same time, or B exists alone. In addition, the character "/" herein generally represents that the former and latter associated objects are in an "or" relationship.

As discussed above, the next-generation (e.g., 5G NR) wireless network is envisioned to support more capacity, data, and services. A UE configured with multi-connectivity may connect to a Master Node (MN) as an anchor and one or more Secondary Nodes (SNs) for data delivery. Each one of these nodes may be formed by a cell group that includes one or more cells. For example, a Master Cell Group (MCG) may be formed by an MN, and a Secondary Cell Group (SCG) may be formed by an SN. In other words, for a UE configured with dual connectivity (DC), the MCG is a set of one or more serving cells including the PCell and zero or more secondary cells. Conversely, the SCG is a set of one or more serving cells including the PSCell and zero or more secondary cells.

As also described above, the Primary Cell (PCell) may be an MCG cell that operates on the primary frequency, in which the UE either performs the initial connection establishment procedure or initiates the connection reestablishment procedure. In the MR-DC mode, the PCell may belong to the MN. The Primary SCG Cell (PSCell) may be an SCG cell in which the UE performs random access (e.g., when performing the reconfiguration with a sync procedure). In MR-DC, the PSCell may belong to the SN. A Special Cell (SpCell) may be referred to a PCell of the MCG, or a PSCell of the SCG, depending on whether the MAC entity is associated with the MCG or the SCG. Otherwise, the term Special Cell may refer to the PCell. A Special Cell may support a Physical Uplink Control Channel (PUCCH) transmission and contention-based Random Access (CBRA), and may always be activated. Additionally, for a UE in an RRC_CONNECTED state that is not configured with the CA/DC, may communicate with only one serving cell (SCell) which may be the primary cell. Conversely, for a UE in the RRC_CONNECTED state that is configured with the CA/DC a set of serving cells including the special cell(s) and all of the secondary cells may communicate with the UE.

FIG. 1 is a schematic diagram illustrating a signaling flow of SL-DRX mechanism during a (conditional) handover procedure according to one embodiment of the present disclosure. In some implementations, the UE (e.g., (SL-Tx) UE#1) may firstly receive one group of SL-DRX configuration (or SL-DRX setting(s), e.g., SL-DRX configuration#1, as shown in FIG. 1) from the UE's serving cell (e.g., source cell) via E-UTRA/NR Uu interface (so it also means the cells shown in FIG. 1 may be configured by a E-UTRA eNB and/or a New Radio gNB).

In some implementations, the (SL-Tx) UE#1 may receive a group of SL-DRX configuration#1 from the source cell. The group of SL-DRX configuration#1 may include one or more SL-DRX configurations and each SL-DRX configuration may be associated with one target sidelink unicast service/sidelink groupcast service/sidelink broadcast service operating by the (SL-Tx) UE#1. In addition, each SL-DRX configuration may further include one or more sidelink (Layer-2) destination IDs in the Access Stratum layer (the sidelink (Layer-2) destination ID, wherein the sidelink destination ID may be derived by the UE from a longer destination ID in sidelink/V2X application layer), and each sidelink destination ID may be associated with a sidelink service. In some implementations, the (SL-Tx) UE#1 may apply the same SL-DRX configuration to a plurality of sidelink groupcast services implemented by the (SL-Tx) UE#1.

In some implementations, one SL-DRX configuration (e.g., SL-DRX configuration associated with the sidelink destination ID SL-DRX_UE#2) included in the SL-DRX configuration#1 may be further associated with a (SL-Rx) UE#2. The (SL-Tx) UE#1 may transmit the configuration/parameters of the SL-DRX_UE#2 to the (SL-Rx) UE#2 via the (E-UTRA/NR) sidelink control signaling (e.g., RRCReconfigurationSidelink message in NR PC5 interface), such as the Sidelink Instruction#1 message (e.g., with SL-DRX configuration#1) as shown in the FIG. 1. The sidelink control signaling may be transmitted from the (SL-Tx) UE#1 to the (SL-Rx) UE#2 via the RRC connection between the (SL-Tx) UE#1 and the (SL-Rx) UE#2.

In some implementations, the (SL-Rx) UE#2 may report the SL-DRX configurations received by the (SL-Rx) UE#2 from one or more paired/grouped UEs (e.g., the (SL-Tx) UE#1) to the serving cell of the (SL-Rx) UE#2 (e.g., Cell#K as shown in FIG. 1) via one or more UL control signalings on E-UTRA/NR Uu interface (as the SidelinkUEInformation#1 shown in the FIG. 1).

In some implementations, the (SL-Rx) UE#2 may transmit one or more sidelink assistance information to one or more paired UEs associated with the (SL-Rx) UE#2 (e.g., UE receiving the same target sidelink unicast service as the (SL-Rx) UE#2), such as the (SL-Tx) UE#1 shown in FIG. 1.

In some implementations, the sidelink assistance information may include multiple SL-DRX settings/SL-DRX configurations and each SL-DRX setting/SL-DRX configuration may include one or more values of SL-DRX Inactivity Timer, SL-DRX on-duration Timer, SL-DRX Retransmission Timer, SL-DRX HARQ RTT-Timer, SL-DRX cycle, SL-DRX slot offset, etc. In addition, each SL-DRX setting/SL-DRX configuration may be associated with one (Layer-2) source/destination ID or a pair (Layer-2) source/destination ID.

In some implementations, the (SL-Tx) UE#1 may receive a group of SL-DRX configuration#2 from the source cell (e.g., as the (conditional) Handover Instruction with SL-DRX configuration#2 shown in FIG. 1). The group of SL-DRX configuration#2 may be determined/configured by the target cell after the target cell receives one (conditional) Handover Request message from the source cell via a backhaul connection between the target cell and the source cell (e.g., via the X2 interface of E-UTRA protocols, the Xn interface of New Radio (NR) protocols, and/or S1 interface through the relaying of Access and Mobility Management Function). Then, the source cell may forward the SL-DRX configuration#2 to the UE via a UE-specific DL control signaling in the air link (e.g., via the E-UTRA Uu interface or NR Uu interface), such as the (conditional) Handover Instruction message in the FIG. 1. The group of SL-DRX configuration#1 may include one or more SL-DRX configuration(s) and each sidelink SL-DRX configuration may be associated with one target sidelink unicast service/sidelink groupcast service/sidelink broadcast service or be associated with a pair of sidelink (Laery-2) source/destination IDs operating in the (SL-Tx) UE#1. In addition, each service may be further associated with one specific (Layer-2) Source/Destination ID associated with the (SL-Tx) UE#1 and the one or more (SL-Rx) UEs.

In some implementations, one SL-DRX configuration (e.g., SL-DRX configuration associated with the sidelink destination ID SL-DRX_UE#2) in the SL-DRX configuration#2 may be further associated with a (SL-Rx) UE#2 and so the (SL-Tx) UE#1 may transmit the configuration/parameters of the SL-DRX_UE#2 to the (SL-Rx) UE#2 via the (E-UTRA/NR) sidelink control signaling (e.g., RRCReconfigurationSidelink message in NR PC5 interface), such as the Sidelink Instruction#2 message as shown in the FIG. 1. The sidelink control signaling may be transmitted from the (SL-Tx) UE#1 to the (SL-Rx) UE#2 via the RRC connection between the (SL-Tx) UE#1 and the (SL-Rx) UE#2.

In some implementations, the (SL-Tx) UE#1 may transmit the SL-DRX configuration#2 to the (SL-Rx) UE#2 only after/while/upon the (SL-Tx) UE#1 has transmitted the (Conditional) Handover Complete message to the Target Cell or while/upon the running timer T304 is stopped, wherein the (Conditional) Handover Complete message may be used to indicate that the (conditional) handover procedure has terminated successfully.

In some implementations, the (SL-Tx) UE#1 may transmit the SL-DRX configuration#2 to the (SL-Rx) UE#2 after/while/upon the (SL-Tx) UE#1 decides to handover to the (selected) target cell (e.g., while the (SL-Tx) UE#1 starts to count a timer T304 or while the timer T304 is still counting).

In some implementations, the (SL-Tx) UE#1 may be enabled/configured to decide SL-DRX configuration(s) for the SL-Rx UE(s) associated with the (SL-Tx) UE#1 after the SL-Tx UE#1 is triggered to move to a candidate cell (e.g., during a conditional handover procedure) and the selected candidate cell configures Mode 2 sidelink resource allocation approach to the (SL-Tx) UE#1.

In some implementations, originally the (SL-Tx) UE#1 may be configured with Mode 1/Mode 2 sidelink resource allocation approach by the serving source cell of the (SL-Tx) UE#1 (e.g., before the (SL-Tx) UE#1 receiving the (conditional) handover instruction or before the (SL-Tx) UE#1 triggering handover procedure to the selected target cell based on the configured triggering events in the (conditional) handover instruction). So, in some implementations, the (SL-Tx) UE#1/(SL-Rx) UE#2 may still apply the SL-DRX configuration provided by the source cell of the (SL-Tx) UE#1 during the (conditional) handover procedure.

In some implementations, the (SL-Tx) UE#1/(SL-Rx) UE#2 may not release the SL-DRX configuration (configured by the source cell) until the (SL-Tx) UE#1 has transmitted one or more RRCReconfigurationComplete messages to the selected target cell (which means the (conditional) handover procedure is terminated successfully). In some implementations, during the (conditional) handover procedure, the (SL-Tx) UE#1 may decide whether to access one or more Type 1 sidelink configured grant configurations (which is configured by the target cell or candidate cell through the (conditional) handover instruction) based on the SL-DRX active time derived by the SL-DRX configurations provided by the source cell.

In some implementations, the (SL-Tx) UE#1 may still be enabled/configured to decide SL-DRX configuration(s) for the SL-Rx UE(s) associated with the (SL-Tx) UE#1 after the (SL-Tx UE)#1 is triggered to move to a candidate cell (e.g., during a conditional handover procedure) and the selected candidate cell configures Type 1 sidelink configured grant configuration to the (SL-Tx) UE#1.

In some implementations, the (SL-Tx) UE#1 may be disabled (or be configured not) to decide SL-DRX configuration(s) for the SL-Rx UE(s) associated with the (SL-Tx) UE#1 after the (SL-Tx) UE#1 is triggered to move to a candidate cell (e.g., during a conditional handover procedure) and the selected candidate cell configures Type 1 sidelink configured grant configuration to the (SL-Tx) UE#1.

In some implementations, the (SL-Rx) UE#2 may further report the SL-DRX configuration#2 received by the (SL-Rx) UE#2 from the (SL-Tx) UE#1 to the serving cell of the (SL-Rx) UE#2 (e.g., Cell#K as shown in FIG. 1) via one or more UL control signalings on E-UTRA/NR Uu interface (as the SidelinkUElnformation#1 shown in the FIG. 1). It should be noted that, in some implementations, the (SL-Rx) UE#2 may report the configured SL-DRX configuration#1 (or SL-DRX configuration#2) via the SidelinkUElnformation#1 message (or SidelinkUElnformation#2 message) to the Cell#K only while the (SL-Rx) UE#2 is staying in (E-UTRA/NR) RRC connected state. In some implementations, the (SL-Rx) UE#2 may not report the configured SL-DRX configuration#1 (or SL-DRX configuration#2) to the Cell#K via the SidelinkUElnformation#1 message (or SidelinkUElnformation#2 message) while the (SL-Rx) UE#2 is staying in (E-UTRA/NR) RRC Inactive state or (E-UTRA/NR) RRC Idle state, wherein the Cell#K may (or may not) be the source cell or the target cell of the (SL-Tx) UE#1 as shown in FIG. 1. The detail of the mechanisms for SL-DRX operation during a (conditional) handover procedure will be described in the following paragraphs.

Based on the introduction about FIG. 1, it may be questionable whether the (Type 1) Sidelink Configured Grant configuration would be affected by SL-DRX configuration. This condition may happen because of the following reasons:

Reason 1: regarding sidelink configured grant configuration, during a conditional handover procedure, a UE may select one target cell (among one or more of candidate cells provided within the (conditional) handover instruction) during the conditional handover procedure. In addition, after the UE triggering the conditional handover procedure associated with the selected target cell, the UE is also able to implement sidelink packet transmissions via the (Type 1) sidelink configured grant configuration if the (Type 1) sidelink configured grant configuration is provided by the target cell (as shown in FIG. 1, the target cell may configure one or more (Type 1) sidelink configured grant configurations via the (conditional) Handover Response message to the source cell and then the source cell may forward the one or more (Type 1) sidelink configured grant configurations to the UE via the (conditional) Handover instruction).

Reason 2: regarding conditional handover procedure, in the beginning of conditional handover procedure, the target cell shown in FIG. 1 may be one of the multiple candidate cells selected by the source cell for handover. In addition, each candidate cell may be configured with one or more individual triggering events. The source cell may configure the UE to monitor the DL channel conditions of these candidate cells. Then, the UE may trigger a conditional handover procedure associated with one target cell among these candidate cells based on the DL channel conditions (e.g., DL-RSRP/DL-RSRQ/DL-SINR) of these candidate cells, wherein the DL channel conditions are monitored/measured by the UE.

Reason 3: regarding SL-DRX configuration, via the same (conditional) Handover Response message, the same target cell may configure one or more SL-DRX configurations (e.g., SL-DRX configuration#2 in FIG. 1) and each of the one or more SL-DRX configurations may be further associated with one or more SL-unicast/SL-groupcast/SL-broadcast services (in the (SL-Tx) UE#1 side, each sidelink SL-unicast/SL-groupcast/SL-broadcast service in the (SL-Tx) UE#1 and (SL-Rx U#2) may be further associated with one target Layer-2 source/destination ID. In addition, the (SL-Tx) UE#1 is also configured with one individual Layer-2 source ID for each of sidelink SL-unicast/SL-groupcast/SL-broadcast services configured in the (SL-Tx) UE#1 side). However, in some implementations, the UE may not be allowed to apply the SL-DRX configuration#2 (configured by the target cell) unless the UE has transmitted a (conditional) Handover Complete message to the target cell, wherein the (conditional) Handover Complete message may indicate that the UE has moved (or being handover) to the target cell successfully and the (conditional) handover procedure is terminated successfully). In some implementations, the UE may be allowed to access the (Type 1/Type 2) sidelink configured grant configurations based on the configured SL-DRX configuration#2 only after the UE handovers to the target cell (e.g., the cell selected by the UE during the conditional handover procedure) successfully. In some implementations, the UE may be allowed to access the (Type 1/Type 2) sidelink configured grant configurations based on the given SL-DRX configuration#2 only after the UE has released/removed the stored (conditional) handover instruction. In some implementations, the SL-DRX configuration#2 provided by the target cell may mis-align with the (Type 1/Type 2) sidelink configured grant configuration, and the sidelink resource may be wasted accordingly.

By considering the possible issue above, the present disclosure provides the following solutions to address the possible conflict issue:

Solution 1: in some implementations, the (SL-Tx) UE#1 may keep implementing the SL-DRX configuration#1 (which may be configured by the source cell via UE-specific DL control signaling/US-specific dedicated control signaling/cell-specific system information delivery before the (conditional) handover procedure) during the (conditional) handover procedure (e.g., while the (SL-Tx) UE#1 is counting a T304 timer during the (conditional) handover procedure or upon the (SL-Tx) UE#1 starts to count the T304 timer during the (conditional) handover procedure). Then, the (SL-Tx) UE#1 may stop applying the SL-DRX configuration#1 (which may be configured by the source cell via UE-specific DL control signaling/UE-specific dedicated control signaling/cell-specific system information delivery) after the (conditional) handover procedure is terminated (e.g., while the counting T304 timer is stopped by the (SL-Tx) UE#1). Then, the (SL-Tx) UE#1 may start to implement the SL-DRX configuration#2 (which is configured by the target cell) after the (SL-Tx) UE#1 handovers to the target cell successfully.

In some implementations, the (SL-Tx) UE#1 may transmit one sidelink instruction#2 to one or more (SL-Rx) UEs to (re)configure a new SL-DRX configuration to the one or more (SL-Rx) UEs based on the SL-DRX configuration#2 configured by the target cell.

In some implementations, the (SL-Tx) UE#1 may start to apply (part of) the SL-DRX configuration#2 (associated with the (SL-Rx) UE#2) only after the (SL-Tx) UE transmitting the Sidelink Instruction#2 to the (SL-Rx) UE#2 successfully (e.g., with/without receiving an ACK/NACK Response message for the Sidelink Instruction#2 from the (SL-Rx) UE#2).

Under the condition that the (SL-Tx) UE#1 keeps applying the SL-DRX configuration#1 during the (conditional) handover procedure, the (SL-Tx) UE#1 may apply the sidelink configured grant(s) configured by the target cell during the (conditional) handover procedure (e.g., via the (conditional) handover instruction). In addition, the (SL-Tx)

UE#1 may decide whether to access an instance/TB transmission opportunity of one sidelink configured grant by jointly considering the running SL-DRX configuration#1 (which is implemented by the (SL-Tx) UE#1 and one or more corresponding paired UEs in the PC5 interface).

Solution 2: in some implementations, the (SL-Tx) UE#1 may start to implement the SL-DRX configuration#2 (which is configured by the target cell via UE-specific DL control signaling/cell-specific system information delivery before the (conditional) handover procedure) during the (conditional) handover procedure (e.g., while the (SL-Tx) UE#1 is counting a T304 timer during the (conditional) handover procedure or upon the (SL-Tx) UE#1 starts to count the T304 timer during the (conditional) handover procedure). Then, the (SL-Tx) UE#1 may keep applying the SL-DRX configuration#2 (which is configured by the source cell via UE-specific DL control signaling/cell-specific system information delivery) after the (conditional) handover procedure is terminated (e.g., while the counting T304 timer is stopped by the (SL-Tx) UE#1).

In some implementations, the (SL-Tx) UE#1 may start to apply (part of) the SL-DRX configuration#2 (associated with the (SL-Rx) UE#2) only after the (SL-Tx) UE#1 transmitting the Sidelink Instruction#2 to the (SL-Rx) UE#2 successfully (e.g., with/without receiving an ACK/NACK Response message for the Sidelink Instruction#2 from the (SL-Rx) UE#2).

Under the condition that the (SL-Tx) UE#1 starts to apply the SL-DRX configuration#2 during the (conditional) handover procedure, the (SL-Tx) UE#1 may also apply the (Type 1/Type 2) sidelink configured grant(s) configured by the target cell during the (conditional) handover procedure (e.g., via the (conditional) handover instruction). In addition, the (SL-Tx) UE#1 may decide whether to access an instance/TB transmission opportunity of one (Type 1/Type 2) sidelink configured grant by jointly considering the running SL-DRX configuration#2 (which is implemented by the (SL-Tx) UE#1 and one or more corresponding paired (SL-Rx) UEs in the PC5 interface).

A sidelink configured grant skipping may be performed by a UE. In some implementations, the UE is configured by the target cell (as shown in FIG. 1) with one or more (Type 1/Type 2) sidelink configured grant configuration by the forwarding of the source cell (e.g., via the (conditional) handover instruction message as shown in FIG. 1). Then, the UE would apply the sidelink configured grant configurations configured by the target cell (i.e., the sidelink configured grant configurations associated with the target cell) after the UE triggering a (conditional) handover event with the selected (candidate) target cell.

However, in some implementations, there may be no available pending sidelink packets on the SL-Tx UE side if all the sidelink destination (Layer-2) IDs associated with the UE are under the off-periods based on each SL-DRX configuration associated with each sidelink destination ID. In this condition, the (SL-Tx) UE#1 (as shown in FIG. 1) may skip the sidelink configured grant configurations and no sidelink packets (or sidelink transport blocks) would be generated/multiplexed and then be transmitted by the (SL-Tx) UE#1 via the (Type 1/Type 2) sidelink configured grant configurations (e.g., during/after the (conditional) handover procedure). In other words, the (SL-Tx) UE#1 may access the (Type 1/Type 2) sidelink configured grant configurations (associated with the target cell) to transmit one or more sidelink packets of one concerned/target Rx UE (or one target Layer-2 destination ID) only during the active time period of the target Rx UE/Layer-2 destination ID.

In some implementations, the (SL-Tx) UE#1 may decide whether to skip/access one or more (Type 1/Type 2) sidelink configured grant configured by the selected (candidate) target cell based on the SL-DRX configuration#1 provided by the source (serving) cell.

In some implementations, a UE may be enabled/configured to access sidelink exceptional resource pool (e.g., sl-TxPoolExceptional) in some exceptional conditions while the UE may be originally configured with Mode 1 sidelink resource allocation mechanism (e.g., if the UE is configured with sl-ScheduledConfig but at least one of the exceptional conditions happens). For example, the UE may be enabled to access sidelink exceptional resource pool while at least one of the following conditions is fulfilled:

Condition 1a: while the timer T310 for MCG or T311 is running.

Condition 1b: while the timer T301 is running (and the cell on which the UE initiated RRC connection re-establishment provides SIB12 including sl-TxPoolExceptional for the concerned frequency).

Condition 1c: if T304 for MCG is running (and the UE is configured with sl-TxPoolExceptional included in sl-ConfigDedicatedNR for the concerned frequency in RRCReconfiguration).

The UE (e.g., (SL-Tx) UE#1 or (SL-Rx) UE#2) may still implement the SL-DRX configuration configured by the UE's serving cell (e.g., if the UE is originally configured with Mode 1 sidelink resource allocation approach with the serving cell) while the conditions 1a, 1b, or 1c being fulfilled.

In some implementations, a UE may be enabled/configured to access sidelink exceptional resource pool (e.g., sl-TxPoolExceptional) in some exceptional conditions while the UE may be originally configured with Mode 2 sidelink resource allocation mechanism (e.g., if the UE is configured with sl-UE-SelectedConfig but at least one of the exceptional conditions happens). For example, the UE may be enabled to access sidelink exceptional resource pool while at least one of the following conditions is fulfilled:

Condition 2a: if a result of sensing on the resources configured in sl-TxPoolSelectedNormal for the concerned frequency included in sl-ConfigDedicatedNR within RRCReconfiguration is not available in accordance with TS 38.214.

Condition 2b: if the PCell provides SIB12 including sl-TxPoolExceptional in sl-FreqInfoList for the concerned frequency.

Condition 2b-1: if the PCell provides SIB12 including sl-TxPoolExceptional in sl-FreqInfoList for the concerned frequency while jointly considering the SL-DRX configuration configured by the (SL-Tx) UE itself.

The UE (e.g., (SL-Tx) UE1/(SL-Rx) UE in RRC Connected state) may still implement the SL-DRX configuration configured by the (SL-Tx) UE itself (e.g., if the (SL-Tx) UE is originally configured with Mode 2 sidelink resource allocation mechanism with the serving cell) while conditions 2a, 2b, or 2b-1 being fulfilled.

In some implementations, the (SL-Tx) UE (e.g., (SL-Tx) UE in RRC connected state) may not be allowed/enabled to change/update/modify the SL-DRX configuration/operation during the exceptional conditions (e.g., 1a/1b/1c/2a/2b) happens. The (SL-Tx) UE may not be allowed/enabled to change/update/modify the SL-DRX configuration/operation while the (SL-Tx) UE is accessing sidelink exceptional resource pools.

In some implementations, the UE (e.g., (SL-Tx) UE#1 as shown in FIG. 1) may temporarily consider that the UE is accessing Mode 2 sidelink resource allocation approach while the (SL-Tx) UE is accessing the sidelink exceptional resource pool (even though the (SL-Tx) UE is originally configured with Mode 1 sidelink resource allocation mechanism by the UE's serving RAN (such as serving cell/source cell/candidate cells during conditional handover procedure/target cell during handover procedure or dual Active Protocol Stack handover)). In this condition, the (SL-Tx) UE may be enabled to modify/change the SL-DRX configurations for the UE's serving sidelink UEs (e.g., (SL-Rx) UE#2 shown in FIG. 1).

In some implementations, the UE (e.g., (SL-Tx) UE in RRC inactive/idle state) may be enabled/configured to access sidelink exceptional resource pool (e.g., sl-TxPoolExceptional) in some exceptional conditions while the UE may be originally configured with Mode 2 sidelink resource allocation mechanism (e.g., based on the sidelink resource pool configuration included in SIB12). For example, the UE may be enabled to access sidelink exceptional resource pool while at least one of the following conditions is fulfilled:

Condition 5a: from the moment the (SL-Tx) UE#1 initiates RRC connection establishment or RRC connection resume proceudre, until receiving an RRCReconfiguration including sl-ConfigDedicatedNR, or receiving an RRCRelease or an RRCReject.

Condition 5b: if a result of sensing on the resources configured in sl-TxPoolSelectedNormal for the concerned frequency in SIB12 is not available in accordance with TS 38.214.

The UE (e.g., (SL-Tx) UE/(SL-Rx) UE in RRC Connected state) may still implement the SL-DRX configuration configured by the UE itself (e.g., if the UE is originally configured with Mode 2 sidelink resource allocation mechanism with the serving cell) while conditions 5a or 5b being fulfilled.

In some implementations, the sidelink exceptional resource pool may not be configured to the UE (e.g., within the SIB12 or sl-ConfigDedicatedNR). In this condition, the UE (e.g., (SL-Tx) UE) may not be enabled (or be disabled) to decide the SL-DRX configuration by itself during the exceptional conditions (e.g., condition 1a/1b/1c/2a/2b) no matter whether the UE is configured with Mode 1/Mode 2 sidelink resource allocation approach before the exceptional condition happens.

In some implementations, the UE (e.g., (SL-Tx) UE/(SL-Rx) UE) may stop implementing SL-DRX configuration/SL-DRX operation during the exceptional cases raised in this disclosure (e.g., condition 1a/1b/1c/2a/2b/5a/5b). In some implementations, the UE (e.g., (SL-Tx) UE/(SL-Rx) UE) may stop implementing SL-DRX configuration/SL-DRX operation while the UE is accessing sidelink exceptional resource pool.

In some implementations, the (SL-Tx) UE/(SL-Rx) UE may still keep implementing SL-DRX configuration based on giving SL-DRX configuration during the exceptional cases raised in this disclosure. However, the UE may stay in SL-DRX Active Time during the exceptional cases raised in this disclosure. In some additional implementations, the (SL-Tx) UE/(SL-Rx) UE may still keep implementing SL-DRX configuration based on giving SL-DRX configuration while the UE is accessing sidelink exceptional resource pools. However, the UE may stay in SL-DRX Active Time while the UE is accessing sidelink exceptional resource pools. In other words, at least some of the SL-DRX timers (e.g., SL DRX OndurationTimer, SL DRX Inactivity Timer) may be stopped/fixed during the exceptional conditions. Then, after the exceptional conditions resolved (or after the UE stop accessing sidelink exceptional resource pool), the UE may re-start/re-count the stopped SL-DRX timers from the stopped value (or from its initial/default/configured value).

A jointly considerations of SL-DRX configuration#1 (from source cell) and SL-DRX configuration#2 (from the selected target cell) may be performed by a UE. In some implementations, the source cell (or the base station configures the source cell) may forward the SL-DRX configurations configured by the source cell (e.g., the SL-DRX configuration#1) to one or more candidate target cells. Then, the one or more candidate target cells may configure SL-DRX configuration#2 to the (SL-Tx) UE through the forwarding of the source cell (e.g., via the (conditional) handover instruction).

In some implementations, the SL-DRX configuration#2 may only cover part of the whole (Layer-2) Destination IDs (or a subset of all of the (SL-Rx) UEs associated with the (SL-Tx) UE) associated with the (SL-Tx) UE. In this condition, the (SL-Tx) UE may implement the SL-DRX operation (e.g., decides the SL-DRX cycles, SL-DRX active time/off-periods among one or more sidelink frequency carrier(s)) by jointly considering the SL-DRX configuration#1 and SL-DRX configuration#2 received by the (SL-Tx) UE.

In some implementations, one specific (Layer-2) Destination ID may be configured with two SL-DRX configurations, e.g., including the SL-DRX configuration#1 and SL-DRX configuration#2 respectively. In this condition, the specific SL-DRX configuration from the target cell may have higher priority than another SL-DRX configuration. In some implementations, the SL-DRX configuration#1 may have a higher priority in comparison with the SL-DRX configuration#2. In some implementations, the SL-DRX configuration#2 may have a higher priority than the SL-DRX configuration#1. In some implementations, the SL-DRX configuration that is received latter may have a higher priority than the SL-DRX configuration that is received earlier. In some implementations, the SL-DRX configuration that is received from a serving cell (e.g., a source cell before (conditional) handover, a target cell after (conditional) handover) may have higher priority than other SL-DRX configuration that is not received from a serving cell. Then, to one (Layer-2) Destination ID, the (SL-Tx) UE may choose the SL-DRX configuration/SL-DRX setting of higher priority. In some implementations, the priority rules may be pre-defined in technical specification (e.g., 3GPP spec), be pre-configured via sidelink pre-configuration, or be configured by serving RAN/paired UE via broadcasting system information and/or ((SL-Tx) UE/(SL-Rx) UE) UE-specific control signaling. In some implementations, it may be (SL-Tx) UE implementation issue to decide the priority rules while one sidelink (Layer-2) Destination ID is configured with more than one SL-DRX settings (e.g., by the source cell and or by the (candidate) target cell respectively).

In some implementations, the SL-DRX configuration#2 provided by the (candidate) target cell may be associated with one specific service Type (e.g., sidelink unicast/groupcast/broadcast service). For example, the (candidate) target cell may configure only SL-DRX configurations for sidelink unicast service (within the (conditional) handover instruction). In this condition, the (SL-Tx) UE may reuse part of the SL-DRX configuration#1 (which is associated with one or more (or all of the) sidelink groupcast services/broadcast services associated with the (SL-Tx) UE) during the (conditional) handover procedure (e.g., while the timer T304 is counting in the (SL-Tx) UE side). In contrast, the (SL-Tx) UE may use/apply (part of) the SL-DRX configuration#2 (which is associated with one or more (or all of the) sidelink unicast services associated with the (SL-Tx) UE) during the (conditional) handover procedure (e.g., while the timer T304 is counting in the (SL-Tx) UE side). It should be noted that, the proposed designs may be applicable to different combinations of sidelink service types in the SL-DRX configuration#1/SL-DRX configuration#2.

Based on 3GPP RANI meeting progress, one UE may be configured (per-resource pool) to implement partial sensing (or not) during the SL-DRX inactive time (or SL-DRX off-periods), as described in table 1.

TABLE 1

| (RAN1 agreements) |
|---|
| Whether UE performs SL reception of PSCCH and RSRP measurement for partial sensing on slots in SL DRX inactive time is enabled/disabled by (pre-)configuration per resource pool when partial sensing is configured in the UE by a higher layer.<br>• When it is enabled,<br>o When UE performs periodic-based partial sensing for a given Preserve, UE monitors only the default periodic sensing occasion.<br>o When UE performs contiguous partial sensing, UE monitors a minimum of M slots for CPS.<br>• Note, when it is disabled, the UE is not required to perform SL reception of PSCCH and RSRP measurement in SL DRX inactive time.<br>• Note: no further optimization on the resource (re)selection procedure with regard to SL DRX operation is specified in Rel.17.<br>• FFS the case when full sensing is configured in the UE by a higher layer |

In some implementations, a UE may also be configured with such partial sensing enabled/disabled mechanism to one or more exceptional resource pool configuration (e.g., per-UE-based configuration/per-resource pool-based configuration/per-cell-based configuration, or per-service based configuration). Accordingly, such association between partial sensing enabled/disabled mechanism and one or more sidelink exceptional resource pools may be pre-defined (e.g., via 3GPP spec)/pre-configured (e.g., via sidelink pre-configuration) or being configured by serving cell/paired UE via cell-specific broadcasting system information and/or UE-specific dedicated control signaling (e.g., RRCReconfiguration message in Uu interface or RRCReconfigurationSidelink message in PC5 interface).

In some implementations, it is not allowed to configure such partial sensing enabled/disabled mechanism to be associated with sidelink exceptional resource pool. Accordingly, the UE could access sidelink exceptional resource pool only via conventional/configured full sensing and/or partial sensing mechanisms. In some implementations, such regulation may be pre-defined (e.g., via 3GPP spec)/pre-configured (e.g., via sidelink pre-configuration) or being configured by serving cell/paired UE via cell-specific broadcasting system information and/or UE-specific dedicated control signaling (e.g., RRCReconfiguration message in Uu interface or RRCReconfigurationSidelink message in PC5 interface).

Regarding the impact of sidelink resource allocation mechanism to the SL-DRX operation, based on the 3GPP meeting progress, one (SL-Tx) UE (in RRC Connected state) may or may not decide the SL-DRX configuration associated with its paired (SL-Rx) UE based on the sidelink resource allocation approach (e.g., Mode 1/Mode 2 sidelink resource allocation approach) configured to the (SL-Tx) UE. However, the SL-DRX operation may be impacted while the serving RAN changes the sidelink resource allocation approach associated with the (SL-Tx) UE. The details of further considerations are summarized in the followings. A summary about the SL-DRX operation by jointly considering the impact of sidelink resource allocation mechanism to SL-DRX operation will be described in the following paragraphs.

Regarding the impact of serving base station (e.g., gNB) during (conditional) handover procedure, in some implementations, the UE (e.g., the (SL-Tx) UE#1 as shown in FIG. 1) in RRC Connected state may firstly being served by the source Cell, which supports SL-DRX configuration (in addition, the (SL-Tx) UE#1 may obtain the SL-DRX configuration#1 from the Source Cell). Then, the (SL-Tx) UE#1 may handover to the target cell, wherein the target cell may not support SL-DRX operation. Based on this scenario, there are some pending issues among the UEs, the source Cell, and the target cell.

In some implementations, the UE (e.g., (SL-Tx) UE#1/(SL-Rx) UE#2 in FIG. 1) may decide whether to keep/maintain/continue the SL-DRX configuration/SL-DRX operation (after the handover procedure) based on the sidelink resource allocation implemented by the (SL-Tx) UE#1/(SL-Rx) UE#2.

In some implementations, the (SL-Tx) UE#1/(SL-Rx) UE#2 may stop/interrupt/discontinue/release the ongoing SL-DRX configuration/SL-DRX operation associated with the (SL-Tx) UE#1/(SL-Rx) UE#2 if the (SL-Tx) UE#1 is implementing Mode 1 sidelink resource allocation approach (e.g., gNB assigns (dynamic/semi-persistent) sidelink grants to the (SL-Tx) UE#1 via Downlink Control Information or UE-specific Radio Resource Control (RRC) signaling) associated with the Target Cell (and the Target Cell does not support SL-DRX operation). In this condition, after the UE handovers to the Target Cell, the (SL-Tx) UE#1 may further instruct the (SL-Rx) UE#2 to release the SL-DRX configuration (e.g., the SL-DRX configuration configured by the (SL-Tx) UE#1, or the SL-DRX configuration configured by the Source Cell and then be forwarded by (SL-Tx) UE#1) after the (SL-Tx) UE#1 handovers to the Target Cell. In addition, the (SL-Tx) UE#1 may not be triggered to report the SidelinkUEInformation (or UEAssistanceInformation) about sidelink DRX operation to the Target Cell (after the UE handovers to the target cell).

In some implementations, the (SL-Tx) UE#1/(SL-Rx) UE#2 may keep/maintain/continue/non-stop the ongoing SL-DRX configuration/SL-DRX operation associated with the (SL-Tx) UE#1/(SL-Rx) UE#2 if the (SL-Tx) UE#1 is implementing Mode 2 sidelink resource allocation approach (e.g., gNB assigns (semi-persistent) sidelink (Tx) resource pool configurations to the UE#1 via Downlink Control Information(s) or UE-specific Radio Resource Control (RRC) signaling) associated with the Target Cell (and the Target Cell does not support SL-DRX operation). In this condition, after the UE handovers to the Target Cell, the (SL-Tx) UE#1 may not further instruct the (SL-Rx) UE#2 to release the SL-DRX configuration (e.g., the SL-DRX configuration configured by the (SL-Tx) UE#1, or the SL-DRX configuration configured by the Source Cell and then be forwarded by (SL-Tx) UE#1) after the (SL-Tx) UE#1 handovers to the Target Cell.

In some implementations, the (SL-Tx) UE#1 may (by default) release the ongoing/stored SL-DRX configuration once the (SL-Tx) UE#1 decides to perform (conditional) handover. Another implementation is that the (SL-Tx) UE#1 may (by default) release the ongoing/stored SL-DRX configuration once the (SL-Tx) UE#1 completes (conditional) handover (e.g., after the (SL-Tx) (SL-Tx) UE#1 transmits the RRCReconfigurationComplete message to the target cell (successfully)).

The intention is that the SL-DRX operation in the source cell is independent of the handover and is independent of whether the target cell supports SL-DRX.

Regarding serving cell changes sidelink resource allocation approach, in some implementations, the serving cell may change the sidelink resource approach (e.g., from Mode 2 to Mode 1 or vice versa) to one or more served UEs (e.g., (SL-Tx) UE#1/(SL-Rx) UE#2 in FIG. 1). In this condition, the UE (e.g., (SL-Tx) UE#1/(SL-Rx) UE#2) and the SL-DRX operation between the UEs may be influenced by the followings condition:

Trigger condition: in some implementations, the (SL-Tx) UE#1 may firstly be configured to implement Mode 2 sidelink resource allocation mechanism (e.g., the (SL-Tx) UE#1 would implement full sensing and/or partial sensing mechanism to select available sidelink grant(s)). So, in this condition, the UE (e.g., (SL-Tx) UE#1/(SL-Rx) UE#2) would not transmit sidelink assistance information (e.g., the preferred SL-DRX parameters/the SL-DRX parameters configured by paired UE/sidelink traffic pattern, such as packet arrival rate, data rate) to the UE's serving cell. However, after the UE is configured to implement Mode 1 sidelink resource allocation mechanism, the UE would be triggered to transmit sidelink assistance information (e.g., via UE-specific UL control signaling, such as the SidelinkUEInformation or UEAssistanceInformation) to transmit the assistance information (such as the preferred SL-DRX parameters/the SL-DRX parameters configured by paired UE/the SL-DRX parameters associated with one specific sidelink (unicast/groupcast/broadcast) service/sidelink traffic pattern, such as packet arrival rate, data rate) to the UE's serving cell (e.g., the Source Cell/Target Cell/Cell#K in FIG. 1).

Cancel condition: in some implementations, the (SL-Tx) UE#1 may firstly be configured to implement Mode 1 sidelink resource allocation mechanism (e.g., the (SL-Tx) UE#lis configured with sidelink dynamic grant(s) and/or sidelink configured grants via the instructions from its serving cell).

In addition, the UE may be triggered to transmit sidelink assistance information (e.g., the preferred SL-DRX parameters/the SL-DRX parameters configured by paired UE/sidelink traffic pattern, such as packet arrival rate, data rate) to the UE's serving cell and the sidelink assistance information is still pending in the UE's buffer. However, the UE may be re-configured by the UE's serving cell from Mode 1 sidelink resource allocation mechanism to Mode 2 sidelink resource allocation mechanism. Then, in this condition, the UE (e.g., the (SL-Tx) UE#1) may cancel/release the pending sidelink assistance information (with the SL-DRX Reject report) transmission procedure after the UE is configured with Mode 2 sidelink resource allocation mechanism. In addition, the UE may cancel a pending Scheduling Request procedure associated with this sidelink assistance information transmission procedure (if there is any). The pending sidelink assistance information transmission may be implemented via the 3GPP LTE/NR protocols (e.g., via SidelinkUEInformation or UEAssistanceInformation procedure). In the condition that the UE (e.g., the (SL-Tx) UE#1) is re-configured by its serving cell from Mode 1 sidelink resource allocation mechanism to Mode 2 sidelink resource allocation mechanism. In some implementations, the UE may not cancel/release the pending sidelink assistance information (which may include the SL-DRX Reject report to the serving cell) transmission procedure after the UE is configured with Mode 2 sidelink resource allocation mechanism since the (SL-Tx) UE#1 may be able to reconfigure. the SL-DRX configuration associated with the (SL-Rx) UE#1 (so the (SL-Tx) UE#1 may still transmit the pending sidelink assistance information to its serving cell via SRB1 (via the master node/primary cell) or SRB3 (to the secondary node/primary secondary cell)). In addition, the UE may not cancel a pending Scheduling Request procedure associated with this sidelink assistance information transmission procedure (if there is any). The pending sidelink assistance information transmission may be implemented via the 3GPP LTE/NR protocols (e.g., via SidelinkUEInformation or UEAssistanceInformation procedure). It should be noted that, proposed mechanisms may also be applicable to the conditions that the (SL-Tx) UE#1 is reconfigured from the Mode 2 sidelink resource allocation mechanism to Mode 1 sidelink resource allocation mechanism.

Regarding Sidelink Assistance Information Enquiry procedure between UEs via PC5 interface, as shown in the examples above, the (SL-Tx) UE#1 may be triggered to transmit sidelink assistance information including SL-DRX-related parameters to a serving cell of the (SL-Tx) UE#1, whether the serving cell supports SL-DRX or not, and/or whether the (SL-Tx) UE#1 is configured with Mode 1 sidelink resource allocation mechanism or not. In this condition, the (SL-Tx) UE#1 may also be triggered to request the sidelink assistance information from the paired UE of the (SL-Tx) UE#1 (e.g., (SL-Rx) UE#2 in FIG. 1).

In some implementations, the (SL-Tx) UE#1 may transmit one sidelink assistance information enquiry message (e.g., for SL-DRX operation) to the (SL-Rx) UE#2. After receiving the sidelink assistance information enquiry message, the (SL-Rx) UE#2 may reply sidelink assistance information (e.g., preferred SL-DRX parameters, sidelink traffic patterns) of the (SL-Rx) UE#2 to the (SL-Tx) UE#1. Then, the (SL-Tx) UE#1 may transmit one or more sidelink assistance information to the serving cell of the (SL-Tx) UE#1 by jointly considering (or based on) the sidelink assistance information received from the (SL-Rx) UE#2 (with/without the sidelink assistance information collected/received from other paired UEs associated with the (SL-Tx) UE#1).

In some implementations, one (SL-Rx) UE (e.g., (SL-Rx) UE#2) may also be triggered to transmit sidelink assistance information whether the serving cell of the (SL-Tx) UE#1/(SL-Rx) UE#2 (e.g., Cell#K in FIG. 1) supports SL-DRX or not, and/or whether the (SL-Rx) UE#2 is configured with Mode 1(or Mode 2) sidelink resource allocation mechanism or not. In this condition, the (SL-Rx) UE#2 may also be triggered to request the sidelink assistance information from the paired UE of the (SL-Rx) UE#2 (e.g., (SL-Tx) UE#1 in FIG. 1) for SL-DRX operation. The (SL-Rx) UE#2 may transmit one sidelink assistance information enquiry message (e.g., for SL-DRX operation) to the (SL-Tx) UE#1. After receiving the sidelink assistance information enquiry message, the (SL-Tx) UE#1 may reply the sidelink assistance information of the (SL-Tx) UE#1 (e.g., preferred SL-DRX parameters, sidelink traffic patterns, SL-DRX configuration) to the SL-Rx) UE#2. Then, the (SL-Rx) UE#2 may transmit one or more sidelink assistance information to the serving cell of the (SL-Rx) UE#2 by jointly considering (or based on) the sidelink assistance information received from the (SL-Tx) UE#1 (with/without the sidelink assistance information collected/received from other paired UEs associated with the (SL-Tx) UE#1).

Regarding cancelling the ongoing Sidelink Assistance Information Enquiry procedure, in some implementations, the UEs (e.g., (SL-Tx) UE#1/(SL-Rx) UE#2 in FIG. 1) may cancel/stop/remove/release the ongoing Sidelink Assistance Information Enquiry procedure if (1) the serving cell of the either the (SL-Tx) UE#1/(SL-Rx) UE#2 side is changed and the new serving cell does not support SL-DRX operation; or (2) the sidelink resource allocation mechanism of the (SL-Tx) UE#1/(SL-Rx) UE#2 is changed from Mode 1 sidelink resource allocation approach to Mode 2 sidelink resource allocation approach.

In other words, the UEs involved in one sidelink unicast service may be triggered to transmit sidelink assistance information to their own serving cell respectively only while the (SL-Tx) UE#1 side is configured with Mode 1 sidelink resource allocation and the serving cell(s) of both side (e.g., (SL-Tx) UE#1/(SL-Rx) UE#2) supports SL-DRX operation. In some implementations, the UE (e.g., the (SL-Tx) UE#1) may implement SL-DRX operation (e.g., the UE#1 may decide/configure the SL-DRX configuration for (SL-Rx) UE#2 alone) if the (SL-Tx) UE#1 is configured with Mode 2 sidelink resource allocation approach, wherein the serving cell of (SL-Tx) UE#1 may support or not support the SL-DRX operation.

In some implementations, the (SL-Rx) UE#2 may implement SL-DRX operation (e.g., based on the SL-DRX configuration provided by the (SL-Tx) UE#1) and report the SL-DRX configuration (provided by the (SL-Tx) UE#1) to the serving cell of the (SL-Rx) UE#2 (e.g., Cell#K in FIG. 1) only while the Cell#K supports SL-DRX operation. In this condition, the (SL-Rx) UE#2 may need to inform the (SL-Tx) UE#1 to release/stop/remove sidelink operation/sidelink configuration (e.g., via PC5 RRC signaling) when the (SL-Rx) UE#2 moves (or handovers) to another serving cell which does not support SL-DRX configuration/SL-DRX operation.

In some implementations, the (SL-Tx) UE#1/(SL-Rx) UE#2 may not cancel/release/remove the ongoing sidelink assistance information to its serving cell if the concerned sidelink assistance information does not include any parameters/Information Elements associated with sidelink DRX configuration/operation/preference.

In some implementations, the (SL-Tx) UE#1/(SL-Rx) UE#2 may not cancel/release/remove the ongoing/pending sidelink assistance information (which includes the SL-DRX Reject report generated by the (SL-Rx) UE) to its serving cell if the concerned sidelink service is terminated.

Regarding Type 1 sidelink configured grant from target cell, in some implementations, the Type 1 sidelink configured grant would be considered as part of the Mode 1 sidelink resource allocation approach.

In some implementations, the UE may receive one or more Type 1 sidelink configured grant configuration(s) in the (conditional) handover command associated with one of the candidate cells.

In this condition, the UE may be able to access the Type 1 sidelink configured grant configuration (once) after the UE decides to handover to the candidate cell (e.g., during the time period that the T304 is counting).

This condition may create some additional impacts to the sidelink DRX operation. For example, the UE (e.g., SL-Tx UE#1/SL-Rx UE#2) may be triggered to generate sidelink assistance information (associated with SL-DRX configuration) to the selected candidate cell after the (conditional) handover procedure is completed successfully (e.g., after the UE transmits the RRC(Connection)ReconfigurationComplete message to the target cell). This condition may happen because the original serving cell of the UE may not support SL-DRX configuration (and the original serving cell configure Mode 2 sidelink resource allocation to the UE).

Regarding the impact of the serving cell changes the sidelink resource allocation approach to the UE, the mechanisms described in the following paragraphs may also be applicable to the condition that a serving cell changes the SL resource allocation mechanism of one served (RRC Connected) UE. For example, the serving cell of a (SL-Tx) UE (e.g., the (SL-Tx) UE#1 in FIG. 1) may be served by the (serving) source cell and the source cell may change the SL resource allocation mechanism from Mode 2 SL resource allocation mechanism to Mode 1 SL resource allocation mechanism.

In this condition, the (SL-Tx) UE may be triggered to report sidelink assistance information (about SL-DRX configuration) to the (serving) source cell. The sidelink assistance information may include the SL-DRX configurations which the (SL-Tx) UE is implementing, and may include the traffic patterns between the (SL-Tx UE) and one or more (SL-Rx) UEs associated with the (SL-Tx) UE. Some of the sidelink assistance information transmitted by the (SL-Tx) UE may be decided based on the sidelink assistance information received by the (SL-Tx) UE from the (SL-Rx) UEs associated with the (SL-Tx) UE.

It should be noted that, the proposed mechanism may also be applicable to the condition that a serving cell changes the SL resource allocation mechanism of one served (RRC Connected) UE. For example, the serving cell of a (SL-Tx) UE (e.g., the (SL-Tx) UE#1 in FIG. 1) may be served by the (serving) source cell and the source cell may change the SL resource allocation mechanism from Mode 1 SL resource allocation mechanism to Mode 2 SL resource allocation mechanism.

In this condition, the (SL-Tx) UE may cancel one ongoing sidelink assistance information (about SL-DRX configuration) to the serving cell of the (SL-Tx) UE.

In some implementations, the (SL-Tx) UE may not cancel/release/remove the ongoing sidelink assistance information to the serving cell of the (SL-Tx) UE if the concerned sidelink assistance information does not include any parameters/Information Elements associated with sidelink DRX configuration/operation.

Regarding the impact of sidelink carrier aggregation, in some implementations, the UEs (e.g., SL-Tx UE#1/SL-Rx UE#2 in FIG. 1) may implement sidelink packet exchange through one or more sidelink frequency carriers.

In some implementations, the serving cell of the sidelink UE (e.g., SL-Tx UE#1/SL-Rx UE#2) may configure the sidelink resource allocation (e.g., via Mode 1/Mode 2 sidelink resource allocation mechanism) cross all the operating sidelink frequency carriers between the SL-Tx UE#1 and the SL-Rx UE#2. In some implementations, the serving cell may configure sidelink resource allocation (e.g., via Mode 1/Mode 2 sidelink resource allocation mechanism) cross only a subset of the operating sidelink frequency carriers between the SL-Tx UE#1 and the SL-Rx UE#2. In addition, the UE (e.g., SL-Tx UE#1 or SL-Rx UE#2) may implement sidelink packet exchanges on other sidelink frequency carriers via Mode 2 sidelink resource allocation mechanism (e.g., the serving cell may only indicate the frequency locations of the sidelink frequency carriers and the UE may try to find a (non-serving) cell on the sidelink frequency carriers by itself). In addition, the non-serving cells may configure sidelink (Transmission/Reception) resource pools for the UE to implement sidelink packet exchange such that the (SL-Tx) UE may still implement full sensing/partial sensing on those sidelink (Tx) resource pools configured by the non-serving cells.

In some implementations, the UE (e.g., SL-Tx UE#1 or SL-Rx UE#2) may implement the proposed mechanisms only based on the sidelink frequency carriers managed/operated/configured by the serving cell. In some implementations, the UE may implement the proposed mechanisms to all the sidelink frequency carriers managed/operated/configured between the SL-Tx UE#1 and the SL-Rx UE#2 (e.g., no matter whether the serving cell could or could not configure Mode 1/Mode 2 sidelink resource allocation/SL-DRX configuration on the sidelink frequency carrier or not).

In some implementations, the SL-DRX configuration/operation may be implemented only on the sidelink frequency carriers managed/operated/configured by the serving cell. That is, the SL-DRX configuration/SL-DRX operation would not be implemented on the sidelink frequency not being managed/operated/configured by the serving cell. Then, the UE (e.g., SL-Tx UE#1 or SL-Rx UE#2) may implement the proposed mechanisms based on which sidelink resource allocation approach (e.g., Mode 1/Mode 2) is provided by the serving cell.

In some implementations, the SL-DRX configuration/operation may be implemented on all the sidelink frequency carriers managed/operated/configured between the SL-Tx UE#1 and the SL-Rx UE#2 (e.g., no matter whether the serving cell has or has not configure Mode 1/Mode 2 sidelink resource allocation/SL-DRX configuration on the concerned sidelink frequency carrier or not).

In some implementations, the UE (e.g., SL-Tx UE#1 or SL-Rx UE#2) may implement different SL-DRX configuration/operation on different sidelink frequency carriers accessed by the UE. In addition, to one or more sidelink frequency carriers, the UE may implement the SL-DRX operation based on the SL-DRX configuration decided by the (SL-Tx) UE#1 itself. To another one or more sidelink frequency carriers, the UE may implement the SL-DRX operation based on the SL-DRX configuration decided by the serving cell of the UE (e.g., the serving cell of (SL-Tx) UE#1).

It should be noted that, the SL-DRX configuration may also include the condition of 'no/empty/none SL-DRX configuration' and 'no SL-DRX operation'. That is, the (SL-Rx) UE#2 may always stay in active time and monitor PDCCH(s) and/or Physical Sidelink Control Channel (PSCCH)/Physical Sidelink Shared Channel (PSSCH) on the one or more sidelink frequency carrier. In addition, the condition of 'no SL-DRX configuration' and 'no SL-DRX operation' may also be decided by the serving cell or by the (SL-Tx) UE#1 itself.

In some implementations, the SL-DRX configuration/SL-DRX operation may or may not implement on sidelink frequency carrier(s) configured for LTE V2X sidelink communication service.

It should be noted that, the Cells shown in the FIG. 1 may be composed by any combinations of E-UTRA cell (configured by eNB s) and/or New Radio (NR) cell (configured by gNBs).

Regarding SL-DRX configuration/sidelink assistance information report, in some implementations, one UE (e.g., (SL-Rx) UE#2 as shown in FIG. 1) may need to report the SL-DRX configurations, which may be configured by other UEs. Reporting procedure for SL-DRX configuration/Sidelink assistance information will be described in the following paragraphs.

Regarding Cancelling Policy Due to sidelink unicast service change/termination, in some implementations, the UE (e.g., the (SL-Rx) UE$ as shown in FIG. 1) in RRC Connected state may cancel/release/remove/postpone/modify the ongoing sidelink assistance information to the UE's serving cell if the UE quits/finishes/terminates all the ongoing sidelink unicast services (e.g., the on-going sidelink unicast/group-cast/broadcast services may be terminated by sidelink/V2X application via PC5 protocols or application signalings).

In some implementations, the UE (e.g., the (SL-Rx UE) as shown in FIG. 1) in RRC Connected state may cancel/release/remove/postpone/modify the ongoing sidelink assistance information to the UE's serving cell if the traffic modes/Tx profiles/QoS profiles associated with all or a subset of the ongoing sidelink unicast/group-cast/broadcast services are changed/modified (e.g., by the application layers of the on-going services or by the NAS layers in the serving networks or by the upper layers of the UE side).

Regarding sidelink assistance information associated with concerned sidelink frequency carrier, in some implementations, one specific sidelink unicast/group-cast/broadcast service may be implemented/realized/operated on one or multiple concerned sidelink frequency carriers.

However, to one UE (e.g., (SL-Tx) UE#1 or (SL-Rx) UE#2), the UE may implement one or more SL-DRX configurations/SL-DRX operations with one or more target destinations on one or more sidelink frequency carriers (which may be all or a subset of the total sidelink frequency carriers implemented/accessed by the UE).

Based on the observations above, one (SL-Rx) UE (e.g., (SL-Rx) UE#2) may report the sidelink assistance information to serving cell (or paired UE) of the (SL-Rx) UE by only considering the sidelink frequency carrier(s) involved in the sidelink packet exchange.

In some implementations, the (SL-Tx) UE (e.g., (SL-Tx) UE#1) may further indicate the sidelink frequency carrier (e.g., by using NR-ARFCN, E-UTRA ARFCN, or by using a (pre-)configured index associated with the concerned frequency carrier. The index may be pre-configured as part of sidelink pre-configuration or be configured by the serving RAN or paired UE via broadcasting system information or via UE-specific RRC signaling (e.g., RRCReconfiguration message or RRCReconfigurationSidelink message)).

Regarding sidelink assistance information associated with concerned sidelink frequency carrier(s) supported by serving radio access network, to one UE (e.g., (SL-Tx) UE or (SL-Rx) UE), the UE may operate on one or more sidelink frequency carriers, wherein the one or more sidelink frequency carriers may be configured by the UE. However, it is possible that only some or a subset of sidelink frequency carriers are supported by the serving RAN. In some implementations, the sidelink frequency carriers operated by the UE may be absent from the sidelink system information (e.g., SIB12, SIB13) transmitted by the serving cell(s). In some implementations, the sidelink frequency carriers operated by the UE may be indicated within the sidelink system information (e.g., SIB12, SIB13) transmitted by the serving cell(s) but the SL-DRX configuration(s) associated with the sidelink frequency carrier (e.g., while one or more sidelink broadcast/group-cast service(s) are implemented/realized on the concerned frequency carrier) is absent.

In some implementations, the condition that one target sidelink (unicast/group-cast/broadcast) services may not support sidelink DRX operation when the sidelink unicast/group-cast/broadcast service may be implemented based on an earlier version of 3GPP technical specification (e.g., 3GPP R-16 specification). In this condition, one cell (or one base station/gNB/eNB) may not broadcast the SL-DRX configuration(s)/SL-DRX setting(s) associated with the one or more sidelink frequency carriers for the concerned sidelink (unicast/groupcast/broadcast) service.

In some implementations, to UE side (e.g., (SL-Tx) UE#1 or (SL-Rx) UE#2), one UE may not implement sidelink DRX operation/sidelink DRX configuration on one or subset of sidelink frequency carriers (accessed by the UE) if the sidelink frequency carrier is not configured/associated with any sidelink DRX configuration (from sidelink pre-configuration/serving RAN instruction (such as broadcasting system information and/or UE-specific RRC signaling)/sidelink RRC signaling).

In some implementations, the UE (e.g., (SL-Tx) UE#1 side) may decide/configure the SL-DRX configuration/SL-DRX operation to one or more target (SL-Rx) UEs (e.g., via sidelink control signaling, such as RRCReconfigurationSidelink message) for one sidelink (unicast/groupcast/broadcast) service on one sidelink frequency carrier if the serving cell does not support the concerned sidelink (unicast/groupcast/broadcast) service and/or the concerned sidelink frequency carrier.

In some implementations, the UE (e.g., the (SL-Rx) UE#2 side) may not report sidelink assistance information for SL-DRX configuration/SL-DRX operation to its serving cell if the (SL-Tx) UE#1 and the (SL-Rx) UE#2 are accessing one or more sidelink frequency carrier not supported/configured by the serving cell (e.g., the serving cell may only indicate the index/location of the concerned sidelink frequency carrier in frequency domain but the serving cell does not configure Mode 1/Mode 2 sidelink resource allocation mechanism on these concerned frequency carrier). In other words, the sidelink frequency carriers may be considered as non-serving frequency to the UEs (e.g., (SL-Tx) UE#1 and (SL-Rx) UE#2) such that the UEs may decide their own SL-DRX configurations/SL-DRX operations by themselves.

In some implementations, the UEs (e.g., (SL-Tx) UE#1 and (SL-Rx) UE#2) may report sidelink assistance information to the UE's serving cell(s) respectively through only a subset of sidelink frequency carrier(s) (which are supported by the serving cell(s)) accessed by the paired UEs (e.g., (SL-Tx) UE#1 and (SL-Rx) UE#2). The serving cell may support the sidelink frequency carrier(s) by configure Mode 1/Mode 2 sidelink resource allocation approach. In contrast, the (SL-Tx) UE#1 and (SL-Rx) UE#2 may not report sidelink assistance information of SL-DRX configuration/SL-DRX operation on the sidelink frequency carrier(s) not supported by their own serving cell(s). In this condition, the serving cell may decide/configure the SL-DRX configuration/operation only associated with the sidelink frequency carriers which be supported by the serving cell. Then, the serving cell may transmit the decided SL-DRX configuration to the (SL-Tx) UE#1 and the (SL-Tx) UE#1 may forward the SL-DRX configuration to the (SL-Rx) UE#2 for the following SL-DRX operation. After receiving the SL-DRX configuration from the serving cell (e.g., the serving cell of the (SL-Tx) UE#1), the (SL-Tx) UE#1 or (SL-Rx) UE#2 may implement SL-DRX operation only on the concerned sidelink frequency carrier(s) indicated/supported by the serving RAN (e.g., serving cell of the (SL-Tx) UE#1).

In some implementations, the sidelink frequency carrier(s) supported by the serving cell of the (SL-Tx) UE#1 may be totally different from/partially overlapped with/the same as the sidelink frequency carrier(s) supported by the serving cell of the (SL-Rx) UE#2. In some implementations, the sidelink frequency carriers supported by the serving cells of (SL-Tx) UE#1 and (SL-Rx) UE#2 may be decided/configured by the serving cells of the (SL-Tx) UE#1 and (SL-Rx) UE#2 respectively. Accordingly, to the (SL-Rx) UE#2 side, it is possible that the (SL-Rx) UE#2 may receive one or more multiple SL-DRX configuration(s)/SL-DRX settings associated with one or more sidelink frequency carrier(s) but none of these concerned sidelink frequency carriers are supported by the serving cell of the (SL-Rx) UE#2 side. In this condition, the (SL-Rx) UE#2 may not report the SL-DRX configuration/SL-DRX setting which the (SL-Rx) UE#2 receives from the (SL-Tx) UE#1 side.

In some implementations, the serving RAN (e.g., the serving cell of the (SL-Tx) UE#1 or (SL-Rx) UE#2) may change/modify/remove/update/add the sidelink frequency carrier(s)/sidelink services supported by the serving cell (or by the base stations which configures these cells) and the (SL-Tx) UE#1 or (SL-Rx) UE#2 may trigger/start a new sidelink assistance information reporting procedure to the serving RAN or cancel/release a pending sidelink assistance information report procedure to the serving RAN accordingly. The serving RAN may change/modify/remove/update the sidelink frequency carrier(s) via system information modification procedure or via UE-specific control signaling delivery. Then, the UE (e.g., (SL-Tx) UE#1 or (SL-Rx) UE#2) may decide to trigger or to stop a sidelink assistance information reporting procedure once the UE observes there is any UE interested sidelink frequency carrier(s)/involved services being changed/modified/removed/updated/added.

Regarding the signaling design associated with/without indicator for the target sidelink frequency carrier, in some implementations, to the serving RAN/serving base station: the base station (or cell) may configure SL-DRX configuration with one or more associated sidelink frequency carrier (e.g., via Absolute radio-frequency channel number (ARFCN)) or with a (pre-configured) index which is (one-to-one) mapped to the concerned sidelink frequency carrier.

In some implementations, the base station (or cell) may configure SL-DRX configurations without additional indicators about target sidelink frequency carrier(s). In this condition, the SL-DRX configuration may be applied to all the sidelink frequency carriers supported by the serving cell. In some implementations, the SL-DRX configuration may be applied to all the sidelink frequency carriers configured to the (SL-Tx) UE#1 or (SL-Rx) UE#2 (or being applied to all the sidelink frequency carriers configured by the serving cell to the (SL-Tx) UE#1 or (SL-Rx) UE#2).

In some implementations, the base station (or cell) may configure SL-DRX configuration associated with one or more specific sidelink (unicast/groupcast/broadcast) service. In addition, the concerned sidelink (unicast/groupcast/broadcast) service may be implemented on one or more specific sidelink frequency carrier(s). In this condition, the (SL-Tx) UE#1 or the (SL-Rx) UE#2 (e.g., which obtains the SL-DRX configuration via the forwarding of the (SL-Tx) UE#1) may implement the SL-DRX configuration on the concerned sidelink frequency carrier(s).

In some implementations, the (SL-Tx) UE (e.g., (SL-Tx) UE#1 as shown in FIG. 1) may configure SL-DRX configuration with one or more associated sidelink frequency carrier (e.g., via Absolute radio-frequency channel number (ARFCN)) or a (pre-configured) index which is (one-to-one) mapped to the concerned sidelink frequency carrier.

In some implementations, the (SL-Tx) UE may configure SL-DRX configurations without additional indicators associated with target sidelink frequency carrier(s). In this condition, the SL-DRX configuration may be applied to all the sidelink frequency carriers configured by the (SL-Tx UE) (to the target (SL-Rx) UE(s) of this concerned sidelink frequency carrier). In some implementations, the SL-DRX configuration may be applied to all the sidelink frequency carriers configured between the (SL-Tx) UE and the (SL-Rx) UE (or being applied to all the sidelink frequency carriers configured by the (SL-Tx) UE to the target (SL-Rx) UE(s)).

In some implementations, the (SL-Tx) UE may configure SL-DRX configuration associated with one or more specific sidelink (unicast/groupcast/broadcast) service. In addition, the concerned sidelink (unicast/groupcast/broadcast) service may be implemented on one or more specific sidelink frequency carrier(s). In this condition, the (SL-Tx) UE and the (SL-Rx) UE (e.g., which obtains the SL-DRX configuration from the (SL-Tx) UE) may implement the SL-DRX configuration on the concerned sidelink frequency carrier(s).

In some implementations, the (SL-Rx) UE may report, one or more SL-DRX configuration(s) associated with one or more associated sidelink frequency carrier (e.g., via Absolute radio-frequency channel number (ARFCN)) or a (pre-configured) index which is (one-to-one) mapped to the concerned sidelink frequency carrier, to the serving cell of the (SL-Rx) UE.

In some implementations, the (SL-Rx) UE may report SL-DRX configurations to the serving cell of the (SL-Rx) UE without additional indicators associated with target sidelink frequency carrier(s). In this condition, the SL-DRX configuration may be applied to all the sidelink frequency carriers supported by the (SL-Rx) UE (or to all the sidelink frequency carriers supported by the serving cell of the (SL-Rx) UE). In some implementations, the SL-DRX configuration may be applied to all the sidelink frequency carriers configured by the serving cell.

In some implementations, the (SL-Rx) UE may report SL-DRX configuration associated with one or more specific sidelink (unicast/groupcast/broadcast) service, to its serving cell. In addition, the concerned sidelink (unicast/groupcast/broadcast) service may be implemented on one or more specific sidelink frequency carrier(s). In this condition, the (SL-Tx) UE and the (SL-Rx) UE (e.g., which obtains the SL-DRX configuration from the (SL-Tx) UE) may implement the SL-DRX configuration (only) on the concerned sidelink frequency carrier(s).

In some implementations, the (SL-Rx) UE may report sidelink assistance information (e.g., one or more preferred SL-DRX configuration(s) associated with one or more associated sidelink frequency carrier (e.g., via Absolute radio-frequency channel number (ARFCN)) or a (pre-configured) index which is (one-to-one) mapped to the concerned sidelink frequency carrier) to one or more target (SL-Tx) UEs.

In some implementations, the (SL-Rx) UE may report sidelink assistance information (e.g., preferred SL-DRX configurations to one or more target (SL-Tx) UEs without additional indicators about target sidelink frequency carrier(s)) to one or more (SL-Tx) UEs. In this condition, the sidelink assistance information may be applied to all the sidelink frequency carriers supported by the (SL-Rx) UE (or to all the sidelink frequency carriers supported by the (SL-Tx) UE). In some implementations, the sidelink assistance information may be applied to all the sidelink frequency carriers configured by the (SL-Tx) UE.

In some implementations, the (SL-Rx) UE may report sidelink assistance information (e.g., preferred SL-DRX configuration associated with one or more specific sidelink (unicast/groupcast/broadcast) service) to one or more (SL-Tx) UEs. In addition, the concerned sidelink (unicast/groupcast/broadcast) service may be implemented on one or more specific sidelink frequency carrier(s). In this condition, the (SL-Tx) UE and the (SL-Rx) UE (e.g., which obtains the SL-DRX configuration from the (SL-Tx) UE) may implement the SL-DRX configuration on the concerned sidelink frequency carrier(s).

Regarding multiple SL-DRX configurations/SL-DRX settings on one sidelink frequency carrier, in some implementations, one or more SL-DRX configurations/SL-DRX settings may be implemented (e.g., by the (SL-Tx) UE/(SL-Rx) UE) jointly on one sidelink frequency carrier. In addition, each SL-DRX configuration may be further composed by the SL-DRX configuration (or SL-DRX settings) associated with one specific sidelink Tx profile/sidelink QoS profile.

In some implementations, one sidelink UE (e.g., (SL-Tx) UE#1 or (SL-Rx) UE#2) may decide the parameters associated with one sidelink (unicast/groupcast/broadcast) service by jointly considering the SL-DRX configuration/SL-DRX settings of the sidelink Tx profiles associated with the concerned sidelink service. For example, a (SL-Tx) UE or a (SL-Rx) UE may determine the on-duration timer applied for groupcast/broadcast transmissions associated with a specific L2 destination ID as the maximum on duration timer configured for any of the QoS profiles associated with that L2 destination ID. For another example, a (SL-Tx) UE or a (SL-Rx) U Emay determine the DRX cycle applied for groupcast/broadcast transmissions associated with a specific L2 destination ID as the minimum DRX cycle configured for any of the QoS profiles associated with that L2 destination ID.

However, based on the understanding of that one or more sidelink service may be implemented on the same sidelink frequency carrier. To one concerned sidelink frequency carrier, the (SL-Tx) UE or (SL-Rx) UE may decide the sidelink discontinuous reception (SL-DRX) procedure on the concerned sidelink frequency carrier based on the following approaches:

Approach 1: a (SL-Tx) UE or a (SL-Rx) UE may determine the on-duration timer applied on the concerned frequency carrier as the maximum on duration timer configured for any of the sidelink (groupcast/broadcast) service associated with the concerned sidelink frequency carrier.

Approach 2: a (SL-Tx) UE or a (SL-Rx) UE may determine the DRX cycle applied on the concerned sidelink frequency carrier as the minimum DRX cycle configured for any of the sidelink service associated with the concerned sidelink frequency carrier.

In some implementations, the (SL-Tx) UE or (SL-Rx) UE may decide the on-duration timer/DRX cycle associated with one sidelink frequency carrier while the sidelink service shares part of common designs in their associated SL-DRX configurations (e.g., the same SL-DRX slot offset, SL-DRX start offset) on the concerned frequency carrier.

Regarding DL-DRX configuration reject report design, in some implementations, one (SL-Rx) UE (e.g., corresponds to one (SL-Tx) UE, wherein both the (SL-Tx) UE and the (SL-Tx) UE may be grouped by the upper layers via PC5-S protocols or via the configuration in application layer/V2X layer) may reject one or more SL-DRX configurations transmitted from the (SL-Tx) UE by transmitting one SL-DRX Reject message, wherein the SL-DRX Reject message may be transmitted via signalings including the RRCReconfigurationCompleteSidelink message or RRCReconfigurationFaiureSidelink message. However, there are some pending issues about how to address the SL-DRX Reject message. Designs for the SL-DRX Reject message transmission between the (SL-Tx) UE/(SL-Rx) UE and the serving RAN(s) of (SL-Tx) UE/(SL-Rx) UE will be descripted in the following paragraphs.

Regarding SL-DRX configuration Reject Design, in some implementations, 'No SL-DRX configuration' or 'SL-DRX configuration release' may be considered as one default SL-DRX configuration after the (SL-Rx) UE rejects the SL-DRX configuration configured by the (SL-Tx) UE (or the SL-DRX configuration configured by the serving cell of the (SL-Tx) UE, wherein the (SL-Rx) UE may receive the SL-DRX configuration through the forwarding of the (SL-Tx) UE).

Explicit indication: in some implementation, 'No SL-DRX configuration' or 'SL-DRX configuration release' may be configured as one explicit indicator to inform the receiver (e.g., serving cell(s) of the (SL-Tx) UE/(SL-Rx) UE or a (SL-Tx) UE/(SL-Rx) UE) during the SL-DRX negotiation procedure among the (SL-Tx) UE, (SL-Rx) UE, serving cell of (SL-Tx) UE, and serving cell of (SL-Rx) UE.

In some implementation, (SL-Rx) UE may report 'No SL-DRX configuration' or 'SL-DRX configuration release' in the suggested SL-DRX configuration to the (SL-Tx) UE for SL-DRX suggestion.

In some implementation, (SL-Rx) UE may report 'No SL-DRX configuration' or 'SL-DRX configuration release' in the reported SL-DRX configuration to the serving cell (or serving RAN) of (SL-Rx) UE for SL-DRX reporting.

In some implementation, (SL-Tx) UE may configure 'No SL-DRX configuration' or 'SL-DRX configuration release' in the configured SL-DRX configuration to the (SL-Rx) UE for SL-DRX reporting.

In some implementations, the serving cell of (SL-Tx) UE may configure 'No SL-DRX configuration' or 'SL-DRX configuration release' in the configured SL-DRX configuration to the (SL-Tx) UE (e.g., via UE-specific DL control signaling) for SL-DRX configuration associated with one or more (SL-Rx) UEs associated with the (SL-Tx) UE.

In some implementations, 'No SL-DRX configuration' or 'SL-DRX configuration release' may be transmitted in the SL-DRX Reject message as the indicator for the (SL-Rx) UE to reject the last received SL-DRX configuration (e.g., configured by a sidelink control signaling, for example, an RRCReconfigurationsidelink message, from the (SL-Tx) UE or the serving cell of the (SL-Tx) UE, wherein the sidelink control signaling may be transmitted via a PC5 RRC connection between the (SL-Rx) UE and the (SL-Tx) UE). To the (SL-Tx) UE/serving cell of the (SL-Tx) UE, they would know that the last configured SL-DRX configuration is rejected by the (SL-Rx) UE according to the SL-DRX reject message. It should be noted that, the 'no SL-DRX configuration' or 'SL-DRX Release' indicator may be pre-defined in the technical specification or pre-installed in the memory module of the (SL-Tx) UE/(SL-Rx) UE/base station for SL-DRX operation. In some implementations, the (SL-Rx) UE may only report RRCReconfigurationFailureSidelink message to the (SL-Tx) UE with the explicit indicator ' SL-DRX Reject'.

Implicit indication: in some implementations, the SL-DRX configuration 'No SL-DRX configuration' or 'SL-DRX configuration release' may be configured/defined as one implicit configuration after the (SL-Rx) UE rejects the SL-DRX configuration (e.g., configured by a sidelink control signaling from the (SL-Tx) UE or the serving cell of the (SL-Tx) UE, wherein the sidelink control signaling may be transmitted via a PC5 RRC connection between the (SL-Rx) UE and the (SL-Tx) UE). In some implementations, one additional indicator 'SL-DRX Rejection' may be (pre-) defined in SL-DRX Reject message such that the (SL-Tx) UE or (SL-Rx) UE may report the SL-DRX Reject condition to the serving RAN/(SL-Tx) UE by transmitting the SL-DRX Rejection indicator. In addition, after transmitting/receiving the SL-DRX Rejection indicator, the (SL-Rx) UE/(SL-Tx) UE/serving cell of the (SL-Tx) UE may apply the default SL-DRX configuration, wherein the default SL-DRX configuration may or may not be the 'no SL-DRX configuration'. In other words, the (SL-Rx) UE/(SL-Tx) UE/serving cell of the (SL-Tx) UE may disable the SL-DRX mechanism (i.e., SL-DRX mechanism corresponding to the SL-DRX configuration) applied for the sidelink service and/or corresponding sidelink destination identity.

Regarding default SL-DRX configuration, in some implementations, 'No SL-DRX configuration' may be pre-defined/pre-configured as one default configuration no matter whether there is a stored/applied/active SL-DRX configuration between the (SL-Tx) UE and (SL-Rx) UE (Note: the stored/applied/active SL-DRX configuration may be configured by the (SL-Tx) UE or by the serving cell of the (SL-Tx) UE).

In some implementations, the (SL-Rx) UE (e.g., within a sidelink unicast/groupcast/broadcast group) may be configured to suggest the (SL-Tx) UE to release one or more (active/inactive) SL-DRX configurations associated with the (SL-Rx) UE (or Layer-2 (sidelink) destination associated with the (SL-Rx) UE) by transmitting the 'No SL-DRX configuration' or 'SL-DRX configuration Release' indicator to the (SL-Tx) UE.

In some implementations, the (SL-Rx) UE may be configured not be able to (or may be disabled to) reject the SL-DRX configuration received from the (SL-Tx) UE.

In some implementations, the (SL-Rx) UE may be configured not be able to (or may be disabled to) reject the SL-DRX configuration received from the serving cell of the (SL-Tx) UE.

In some implementations, the (SL-Tx) UE may further indicate the source of the SL-DRX configuration (e.g., configured by the (SL-Tx) UE itself or configured by the serving cell of the (SL-Tx) UE) via the SL-DRX configuration to the (SL-Rx) UE. Then, the (SL-Rx) UE may decide whether the (SL-Rx) UE itself could reject the SL-DRX configuration by considering the source of the SL-DRX configuration.

Regarding the impact to RRCReconfigurationFailureSidelink message, in some implementations, the (SL-Rx) UE may reply RRCReconfigurationFailureSidelink message to the (SL-Tx) UE for SL-DRX Reject message delivery. However, in some implementations, the (SL-Rx) UE may reply RRCReconfigurationFailureSidelink message to the (SL-Tx) UE while the (SL-Rx) UE could not compile/apply other parts of sidelink configurations (e.g., sidelink configurations besides SL-DRX configuration). In some implementations, the (SL-Tx) UE may not update/re-configure the SL-DRX configuration in the corresponding RRCReconfigurationSidelink message (e.g., the RRCReconfigurationSidelink message that the (SL-Rx) UE replies by transmitting the RRCReconfigurationComplegeSidelink/RRCReconfigurationFaiureSidelink message) to the (SL-Rx) UE. In this condition, the (SL-Rx) UE may reply one RRCReconfigurationFailureSidelink to the (SL-Tx) UE and it may or may not have impact to the active SL-DRX configuration if there is one active SL-DRX configuration between the (SL-Tx) UE and (SL-Rx) UE.

In some implementations, the (SL-Tx) UE/(SL-Rx) UE may consider sidelink RRC reconfiguration failure event happens while the (SL-Rx) UE rejects the SL-DRX configuration to the (SL-Tx) UE via the SL-DRX reject message such as an RRCReconfigurationFaiureSidelink message (or an RRCReconfigurationCompletesidelink message). For example, the SL-DRX reject message may include a SL-DRX reject indication indicating a sidelink failure event for the PC5 RRC connection between the (SL-Rx) UE and the (SL-Tx) UE. In some implementations, the (SL-Tx) UE or (SL-Rx) UE may not consider sidelink RRC reconfiguration failure event happens while the (SL-Rx) UE rejects the SL-DRX configuration to the (SL-Tx) UE via the RRCReconfigurationCompleteSidelink message. This condition may consider as a partial sidelink RRC reconfiguration failure event between both the (SL-Tx) UE and the (SL-Rx) UE).

In some implementations, the (SL-Tx) UE and the (SL-Rx) UE may cancel/release the active SL-DRX configuration between the (SL-Tx) UE and the (SL-Rx) UE (if there is any active SL-DRX configuration such that the (SL-Tx) UE/(SL-Rx) UE may move back to the state of 'no SL-DRX configuration' between the (SL-Tx) UE and the (SL-Rx) UE) after the (SL-Rx) UE transmitting the RRCReconfigurationFailureSidelink message to the (SL-Tx) UE or after the (SL-Tx) UE receiving the RRCReconfigurationFailureSidelink message from the (SL-Rx) UE.

In some implementations, the (SL-Tx) UE or the (SL-Rx) UE may maintain/resume/keep the active SL-DRX configuration between the (SL-Tx) UE and (SL-Rx) UE (if there is any) after the (SL-Rx) UE transmitting the RRCReconfigurationFailureSidelink message to the (SL-Tx) UE or after the (SL-Tx) UE receiving the RRCReconfigurationFailureSidelink message from the (SL-Rx) UE.

In some implementations, the (SL-Tx) UE and the (SL-Rx) UE may change to apply one 'default SL-DRX configuration' (or one default SL-DRX state) between the (SL-Tx) UE and (SL-Rx) UE after the (SL-Rx) UE transmitting the RRCReconfigurationFailureSidelink message to the (SL-Tx) UE or after the (SL-Tx) UE receiving the RRCReconfigurationFailureSidelink message from the (SL-Rx) UE. In some implementations, the SL-DRX configuration may include at least one parameter for SL-DRX configuration (e.g., default values of any combinations of sl-drx-onDurationTimer/sl-drx-SlotOffset/sl-drx-InactivityTimer/sl-drx-RetransmissionTimer/sl-drx-StartOffset/sl-drx-Cycle/sl-drx-HARQ-RTT-Timer). In some implementations, 'No SL-DRX configuration' (or 'No SL-DRX state/condition') may be the default 'SL-DRX state' between the (SL-Tx) UE/(SL-Rx) UE. When the 'No SL-DRX configuration' is applied by the UE (e.g., (SL-Tx) UE or (SL-Rx) UE), the UE may disable the SL-DRX mechanism corresponding to the rejected SL-DRX configuration for the sidelink service and the sidelink destination identity.

In some implementations, the default SL-DRX configuration may be configurable to the (SL-Tx) UE or (SL-Rx) UE based on sidelink pre-configuration/serving RAN configuration (via broadcasting system information, UE-specific DL RRC signaling in the Uu interface, UE-specific dedicated control signaling, or PC5 RRC signalings between the (SL-Tx) UE and the (SL-Rx) UE).

In some implementations, the disclosed mechanism may also be applicable while the (SL-Rx) UE replies the SL-DRX Reject report to the (SL-Tx) UE (or to the serving cell via the relay of the (SL-Tx) UE) via RRCReconfigurationCompleteSidelink message.

In some implementations, the disclosed mechanism may also be applicable while the (SL-Rx) UE replies the SL-DRX Reject report to the serving cell via UEAssistanceInformationSidelink message (e.g., by further indicating no SL-DRX, SL-DRX reject, or SL-DRX release in the UEAssistanceInformationSidelink message).

In some implementations, the serving cell may resume to the active/configured SL-DRX configuration associated with the (SL-Rx) UE after the serving cell receives the SL-DRX Reject report from the (SL-Rx) UE (e.g., via the forwarding of (SL-Tx) UE).

In some implementations, the (SL-Tx) UE may report the SL-DRX Reject message (associated with one or more (SL-Rx) UEs) to the serving cell of the (SL-Tx) UE via the RRCReconfigurationFailure message (e.g., after the (SL-Tx) UE receives the rejected SL-DRX configuration via a RRCReconfiguration message from the serving cell of the (SL-Tx) UE).

In some implementations, the (SL-Tx) UE may report the SL-DRX Reject message (associated with one or more (SL-Rx) UEs) to the serving cell of the (SL-Tx) UE via the RRCReconfigurationComplete message (e.g, after the (SL-Tx) UE receives the rejected SL-DRX configuration via a RRCReconfiguration message from the serving cell of the (SL-Tx) UE).

In some implementations, the (SL-Tx) UE may report the SL-DRX Reject message (associated with one or more (SL-Rx) UEs) to the serving cell of the (SL-Tx) UE via the SidelinkUEInformationNR message.

It should be noted that, the disclosed mechanisms may also be applicable to the E-UTRA protocols. For example, the (SL-Tx) UE may report the SL-DRX Reject message to the serving E-UTRA cell of the (SL-Tx) UE via RRC (Connection)ReconfigurationFailure/RRC(Connection)Reconfiguration Complete/SidelinkUEInformationEUTRA message.

In some implementations, the (SL-Rx) UE may be configured with one SL-DRX configuration (e.g., which is called the 'New SL-DRX (configuration)' in this scenario) to replace one original SL-DRX configuration stored by the (SL-Rx) UE (e.g., which is called the 'old SL-DRX (configuration)' in this scenario). However, in some implementations, the 'old SL-DRX configuration may be configured by the (SL-Tx) UE and then the new SL-DRX configuration may be configured by the serving cell of the (SL-Tx) UE. In this condition, the (SL-Rx) UE may reject the new SL-DRX configuration after the (SL-Tx) UE transmitting the new SL-DRX configuration to the (SL-Rx) UE (e.g., via PC5 RRC signaling). In this condition, the (SL-Tx) UE may report one 'new SL-DRX Reject' indicator to the serving cell of the (SL-Tx) UE after the (SL-Tx) UE receiving the 'new SL-DRX Reject' indicator from the (SL-Rx) UE (e.g., via PC5 RRC signaling).

In some implementations, the (SL-Tx) UE may need to report 'new SL-DRX Reject' event (e.g., via a SL-DRX Reject message) to the serving cell of the (SL-Tx) UE by: reporting the index of the new SL-DRX configuration (which is rejected by the (SL-Rx) UE) and the associated (Layer-2) Destination of the (SL-Rx) UE to the serving cell.

In some implementations, the indicator of '(new) SL-DRX Reject' (which may also be considered as one 'new SL-DRX Reject' event) may be transmitted via RRC signaling or via one or more (NR/E-UTRA) uplink RRC signalings.

In some implementations, the pending 'SL-DRX Reject' report (e.g., the SL-DRX Reject report from the (SL-Tx) UE to the serving cell of the (SL-Tx) UE) may be cancelled/released by the (SL-Tx) UE while at least one of the following events happens:

Event A: the (SL-Tx) UE is changed from (NR) Mode 1 sidelink resource allocation approach to Mode 2 sidelink resource allocation approach.

Event B: the sidelink unicast service associated with the (SL-Tx) UE and (SL-Rx) UE (and the new SL-DRX) is released. In other words, if the cast type associated with the (SL-Tx) UE and (SL-Rx) UE corresponds to a sidelink unicast service, the (SL-Tx) UE may reject the SL-DRX configuration by transmitting a first signaling (with/without sidelink destination ID associated with the sidelink service) other than the ' SL-DRX Reject' report to the serving cell, wherein the first signaling may include a SL-DRX reject indication indicating a sidelink failure event for the PC5 RRC connection between the (SL-Rx) UE and the (SL-Tx) UE. If the cast type associated with the (SL-Tx) UE and (SL-Rx) UE corresponds to a sidelink groupcast service, the (SL-Tx) UE may reject the SL-DRX configuration by transmitting the 'SL-DRX Reject' report (with/without sidelink destination ID associated with the sidelink service) to the serving cell via a second signaling, wherein the second signaling may include a SL-DRX indication indicating the SL-DRX mechanism (e.g., the SL-DRX mechanism corresponding to the sidelink service) is not applied for the sidelink destination ID (e.g., the sidelink destination ID corresponding to the sidelink service).

Event C: the (SL-Tx) UE moves from (NR/E-UTRA) RRC Connected state to (NR/E-UTRA) RRC Inactive/Idle state.

Event D: the (SL-Rx) UE accepts another SL-DRX configuration from the (SL-Tx)

UE.

Event E: the (conditional) handover procedure is triggered by the (SL-Tx) UE. In some implementations, the (SL-Tx) UE may transmit the SL-DRX Reject report to the target cell after the (conditional) handover procedure is finished successfully.

Event F: the rejected SL-DRX configuration is replaced by the serving RAN (e.g., the target cell of conditional handover procedure).

In some implementations, the new SL-DRX configuration, which is rejected by the (SL-Rx) UE, may be overwritten/replaced by another 'candidate SL-DRX configuration' configured by a candidate cell (via a conditional handover command) while the (SL-Tx) UE triggers handover procedure associated with the candidate cell because of one or more triggering requirements associated with the candidate cell (e.g., the one or more triggering requirements conditional handover command stored in the (SL-Tx) UE side) are fulfilled. This condition may happen when the (SL-Tx) UE changes the serving cell of the (SL-Tx) UE by triggering the (conditional) handover procedure.

In some implementations, the (SL-Tx) UE may trigger (conditional) handover procedure associated with one candidate (target) cell while the at least one or more triggering requirements is fulfilled. While the new SL-DRX configuration is replaced (e.g., being replaced by a SL-DRX configuration provided by the candidate cell), the (SL-Tx) UE may release the 'SL-DRX Reject message' pended in the (SL-Tx) UE side.

In some implementations, the new SL-DRX configuration may not be impacted by the (conditional) handover procedure associated with one candidate (target) cell (e.g., the target cell of the conditional handover event). It is because the target cell does not change/modify/release the (new) SL-DRX configuration(s) associated with the (SL-Tx) UE or the (SL-Rx) UE. In this condition, the (SL-Tx) UE may transmit the (new) SL-DRX reject report to the new serving cell (which is the target cell as shown in FIG. 1).

In this condition, the (SL-Tx) UE may report/transmit the SL-DRX Reject report/SL-DRX Reject message to the target cell (which is the candidate cell decided by the (SL-Tx) UE as the target cell of one (conditional) handover procedure) after the (SL-Tx) UE handovers to the target cell successfully (e.g., after the (SL-Tx) UE transmitting the RRCReconfigurationComplete/HandoverComplete message to the target cell (successfully)).

In some implementations, the (rejected) SL-DRX configuration may be replaced by a SL-DRX Indicator. In some implementations, one SL-DRX indicator may be configured by the (SL-Tx) UE in the PC5 RRC signaling.

It should be noted that, the disclosed mechanisms may not be limited by the conditional handover procedure and may also be applicable to conventional handover procedure or Dual Active Protocol Stacks (DAPS) handover procedure.

It should be noted that, the disclosed mechanisms may be applicable to intra-RAT/inter-RAT/intra-system/inter-system (conditional) handover procedure.

In some implementations, when the (SL-Rx) UE rejects one configured SL-DRX configuration from the (SL-Tx) UE, the (SL-Tx) UE and the (SL-Rx) UE may resume to a default SL-DRX configuration. In some implementations, the default SL-DRX configuration may be 'No SL-DRX configuration' between the (SL-Tx) UE and the (SL-Rx) UE.

In some implementations, the default SL-DRX configuration may apply to the serving RAN. In some conditions, the serving RAN may consider/assume there is no activated SL-DRX configuration (or there is one default SL-DRX configuration) between the (SL-Tx) UE and (SL-Rx) UE after the serving cell (of the (SL-Tx) UE) receives the 'new SL-DRX Reject' message from the serving cell.

In some implementations, the (SL-Tx) UE may receive the rejected SL-DRX configuration (which is provided/configured by the serving cell for the (SL-Rx) UE and being rejected by the (SL-Rx) UE by transmitting RRCReconfigurationFailureSidelink message and/or RRCReconfigurationCompleteSidelink message to the (SL-Tx) UE) from the serving cell of the (SL-Tx) UE (e.g., via the RRCReconfiguration message transmitted from the serving cell of the (SL-Tx) UE to the (SL-Tx) UE on the LTE/NR Uu interface).

In some implementations, after receiving the SL-DRX Reject message from the (SL-Rx) UE, the (SL-Tx) UE may be triggered to transmit one UL RRC signaling to the serving cell of the (SL-Tx) UE to report the SL-DRX Reject condition.

In some implementations, the UL RRC signaling (with the SL-DRX Reject report) may be transmitted by the (SL-Tx) UE (to the serving primary cell/master node of (SL-Tx) UE) via RRCReconfigurationComplete message. In this condition, the (new) SL-DRX Reject event would not be treated as a RRC reconfiguration failure event (between the RAN and the (SL-Tx) UE) such that the (SL-Tx) UE may apply/ configure the AS configurations associated with the rejected SL-DRX configuration in the same RRCReconfiguration message.

In some implementations, the UL RRC signaling (with the SL-DRX Reject report) may be transmitted by the (SL-Tx) UE (to the serving primary cell/master node of (SL-Tx) UE) via RRCReconfigurationFailure message. In this condition, the new SL-DRX Reject event would be treated as a RRC reconfiguration failure event (between the RAN and the (SL-Tx) UE) such that the (SL-Tx) UE may ignore/release the other AS configurations associated with the rejected SL-DRX configuration in the same RRCReconfiguration message.

In this condition, the (SL-Tx) UE may keep/maintain the originally activated Access Stratum (AS) configuration prior than the reception of RRCReconfiguration message.

In some implementations, the UL RRC signaling (with the SL-DRX reject report) may be transmitted by the (SL-Tx) UE (to the serving primary cell/master node of (SL-Tx) UE) via SidelinkUEInformationNR message. In this condition, the new SL-DRX Reject event would not be treated as a RRC reconfiguration failure event (between the RAN and the (SL-Tx) UE) such that the (SL-Tx) UE may apply/configure the AS configurations associated with the rejected SL-DRX configuration in the same RRCReconfiguration message.

In some implementations, the (SL-Tx) UE may receive the rejected SL-DRX configuration (which may be configured by the serving RAN of the (SL-Tx) UE for one or more (SL-Rx) UEs associated with the (SL-Tx) UE) via a conditional handover command associated with one candidate cell (for handover procedure). While the (SL-Tx) UE decides to initiate handover procedure to the candidate cell (e.g., while one or more triggering conditions associated with the candidate cell are fulfilled) and there is one SL-DRX configuration associated with one (SL-Rx) UE of the (SL-Tx) UE, the (SL-Tx) UE may configure the SL-DRX configuration to the corresponding (SL-Rx) UE (e.g., via RRCReconfigurationSidelink message on the NR/LTE PC5 interface) after the UE triggers (conditional) handover procedure.

However, based on the descriptions mentioned above, the (SL-Rx) UE may reject the SL-DRX configuration (which is configured by the candidate cell/base station which configures the candidate cell) to the (SL-Tx) UE (e.g., via PC5 RRC signaling, such as RRCReconfigurationFailureSidelink message and/or RRCReconfigurationCompleteSidelink message to the (SL-Tx) UE). After receiving the SL-DRX Reject message from the (SL-Rx) UE, the (SL-Tx) UE may need to report this failure condition to the target cell of the (conditional) handover procedure (which may also become the serving cell of the (SL-Tx) UE after the (SL-Tx) UE transmitting RRCReconfigurationComplete message (successfully) to the candidate cell). It should be noted that, the (SL-Tx) UE may report the SL-DRX Reject message in different approaches.

In some implementations, the (SL-Tx) UE may be triggered to start RRC re-establishment procedure (e.g., by transmitting the RRC re-establishmentRequest message to the candidate cell/target cell/serving cell/serving RAN (the (SL-Tx) UE may initiate the RRC re-establishment procedure with the selected candidate cell or other cells)) if the SL-DRX configuration configured by the candidate cell is rejected by the (SL-Rx) UE. The (SL-Tx) UE may have the chance to re-connect with the serving RAN to solve the SL-DRX Reject condition by maintaining its RRC connection with the serving RAN.

In some implementations, the (SL-Tx) UE may report the SL-DRX Reject (report) message to the serving cell (which is also the candidate cell selected by the (SL-Tx) UE for the conditional handover procedure) after the (conditional) handover procedure. For examples, the (SL-Tx) UE may be triggered/configured to transmit SidelinkUEInformationNR message to report the SL-DRX Reject message/event (e.g., by reporting the Layer-2 ID of the (SL-Rx) UE and/or index of the reject SL-DRX configuration) to the serving cell after the (SL-Tx) UE transmitting the RRCReconfigurationComplete message to the serving cell successfully. In some implementations, the SL-DRX Reject message may be included in the RRCReconfigurationComplete message to the serving cell. It should be noted that, while the UE reports the SL-DRX Reject message to the serving cell after transmitting the RRCReconfigurationComplete message, the SL-DRX Reject event may not cause failure event of the RRC connection between the (SL-Tx) UE and the serving RAN.

It should be noted that, the disclosed handover procedure may include conventional handover procedure, conditional handover procedure, or Dual Active Protocol Stack (DAPS) handover procedure.

In some implementations, the RRC connection between the (SL-Tx) UE and the source serving cell may be implemented on LTE Uu interface (e.g., the original source cell may be a E-UTRA cell and the candidate cell may be a New Radio (NR) cell or a E-UTRA cell). In this condition, the RRC message between the (SL-Tx) UE and the source serving cell may include the RRCConnectionReestablishmentRequest, RRCConnectionReconfigurationComplete, or RRCConnectionReconfiguration message.

In some implementations, the RRC connection between the (SL-Tx) UE and the source serving cell may be implemented on NR Uu interface (e.g., the original source cell may be a New Radio cell and the candidate cell may be a New Radio (NR) cell or a E-UTRA cell). In this condition, the RRC message between the (SL-Tx) UE and the source serving cell may include the RRCReestablishmentRequest, RRCReconfigurationComplete, or RRCReconfiguration message.

In some implementations, the UE/serving RAN may apply different proposed mechanisms in the present disclosure based on the RATs (e.g., E-UTRA or NR RAT) of the source cell.

In some implementations, the (SL-Tx) UE may trigger a RRC reconfiguration failure event if the SL-DRX configuration (configured by the serving cell of the (SL-Tx) UE) is rejected by the (SL-Rx) UE, wherein one sidelink RRC reconfiguration failure event may or may not be announced by the (SL-Tx) UE or (SL-Rx) UE in this condition.

In some implementations, the (SL-Tx) UE may trigger a RRC reconfiguration failure event only if the SL-DRX configuration (configured by the serving cell of the (SL-Tx) UE) is rejected by the (SL-Rx) UE, wherein one sidelink RRC reconfiguration failure event is announced by the (SL-Tx) UE or (SL-Rx) UE in this condition.

In some implementations, the (SL-Tx) UE may not trigger a RRC reconfiguration failure event only if the SL-DRX configuration (configured by the serving cell of the (SL-Tx) UE) is rejected by the (SL-Rx) UE, wherein one sidelink RRC reconfiguration failure event may or may not announced by the (SL-Tx) UE or (SL-Rx) UE in this condition.

In some implementations, the (SL-Tx) UE may not trigger a RRC reconfiguration failure event only if the SL-DRX configuration (configured by the serving cell of the (SL-Tx) UE) is rejected by the (SL-Rx) UE, wherein one sidelink RRC reconfiguration failure event is announced by the (SL-Tx) UE or (SL-Rx) UE in this condition). In some implementations, the (SL-Tx) UE may trigger a RRC reconfiguration failure event even the SL-DRX configuration (configured by the serving cell of the (SL-Tx) UE) is rejected by the (SL-Rx) UE, wherein one sidelink RRC reconfiguration failure event is announced by the (SL-Tx) UE or (SL-Rx) UE in this condition.

In some implementations, the (SL-Tx) UE may not trigger a RRC reconfiguration failure event when the SL-DRX configuration (configured by the serving cell of the (SL-Tx) UE) is rejected by the (SL-Rx) UE, wherein the (SL-Tx) UE or the (SL-Rx) UE may not trigger a sidelink RRC reconfiguration failure event while the SL-DRX configuration is rejected by the (SL-Rx) UE.

In some implementations, the (SL-Rx) UE may be configured/enabled/disabled (by the serving cell of (SL-Rx) UE or by the (SL-Tx) UE) to reject SL-DRX configuration.

In some implementations, the (SL-Tx) UE may transmit one Failure report to the serving cell of the (SL-Tx) UE for the SL-DRX reject report. In some implementations, the (SL-Tx) UE may further transmit/indicate the 'FailureType' as sidelink reconfiguration failure/SL-DRX reject/SL-DRX configuration Reject event in the Failure report. In some implementations, the failure report (with/without the 'FailureType') may be transmitted within the Information Element 'FailureReportMCG' to the serving cell. In some implementations, the Failure report may be transmitted by the (SL-Tx) UE to the serving cell of the (SL-Tx) UE via UL RRC signaling or MAC CE. In some implementations, the disclosed failure report design may also be applicable to the SL-DRX Reject report from the (SL-Rx) UE to the (SL-Tx) UE (e.g., via PC5 RRC signaling and MAC CE).

In some implementations, the (SL-Rx) UE may be configured with more than one SL-DRX group configurations. Different SL-DRX group configurations (e.g., SL-DRX group#1 and SL-DRX group#2) may be associated with different sidelink frequency carriers, different serving cells, or different ranges of sidelink frequency carriers (e.g., FR1/FR2 in NR protocols) respectively.

In some implementations, the (SL-Rx) UE may reject both or only one of the SL-DRX groups (e.g., either SL-DRX group#1 or SL-DRX group#2). In some implementations, the (SL-Rx) UE could not reject only one of the SL-DRX groups. That is, both the SL-DRX group#1 and SL-DRX group#2 should be admitted/rejected by the (SL-Rx) UE jointly.

In some implementations, the (SL-Rx) UE may be able to reject part of the assigned SL-DRX configuration (e.g., the (SL-Rx) UE may further indicate/report which SL-DRX parameters that the (SL-Rx) UE rejects). In some implementations, the (SL-Tx) UE may report/forward the report to the serving cell of the (SL-Tx) UE). In this condition (i.e., partial SL-DRX reject condition), the RRC reconfiguration failure event (on Uu interface) or the sidelink RRC reconfiguration failure event (on PC5 interface) may or may not be announced.

Serving Cells of a MAC entity may be configured by RRC in two DRX groups with separate DRX parameters. When RRC does not configure a secondary DRX group, there is only one DRX group and all Serving Cells belong to that one DRX group. When two DRX groups are configured, each Serving Cell is uniquely assigned to one of the two groups. The DRX parameters that are separately configured for each DRX group may include: drx-onDurationTimer, drx-InactivityTimer. The DRX parameters that are common to the DRX groups are: drx-SlotOffset, drx-RetransmissionTimerDL, drx-RetransmissionTimerUL, drx-LongCycleStartOffset, drx-ShortCycle (optional), drx-ShortCycleTimer (optional), drx-HARQ-RTT-TimerDL, or drx-HARQ-RTT-TimerUL.

It should be noted that, since a UE monitors PDCCH for Sidelink Mode 1 in one DRX group, drx-RetransmissionTimerSL/drx-HARQ-RTT-TimerSL is not added to common DRX parameters of DRX group.

Figure 2:
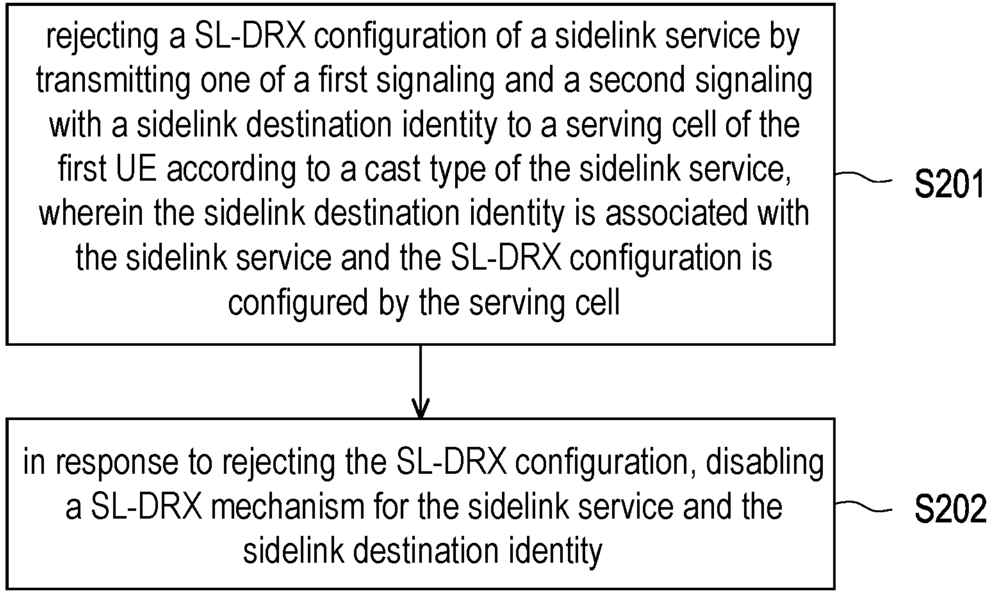
FIG. 2 is a flowchart illustrating a method of SL-DRX adapted to a UE according to one embodiment of the present disclosure.

FIG. 2 is a flowchart illustrating a method of SL-DRX adapted to a UE according to one embodiment of the present disclosure. In step S201, rejecting a SL-DRX configuration of a sidelink service by transmitting one of a first signaling and a second signaling with a sidelink destination identity to a serving cell of the first UE according to a cast type of the sidelink service, wherein the sidelink destination identity is associated with the sidelink service and the SL-DRX configuration is configured by the serving cell. In step S202, in response to rejecting the SL-DRX configuration, disabling a SL-DRX mechanism for the sidelink service and the sidelink destination identity.

Figure 3:
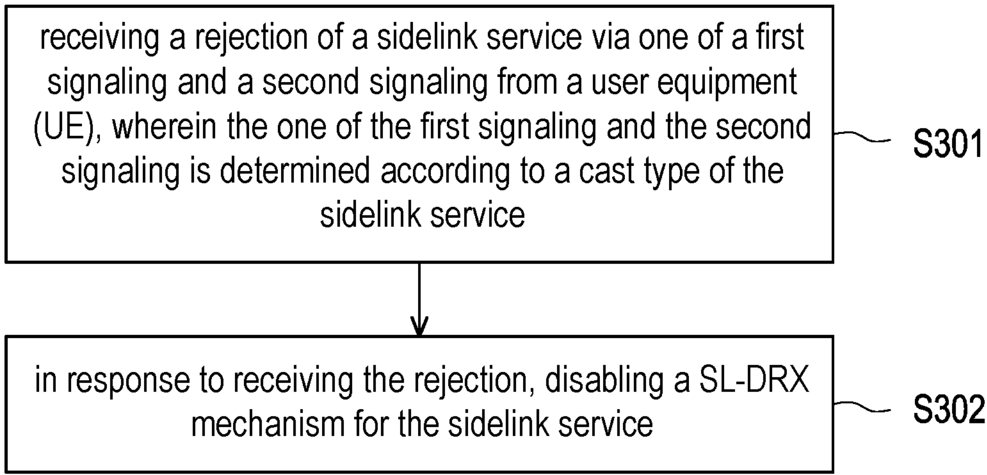
FIG. 3 is a flowchart illustrating a method of SL-DRX adapted to a BS according to one embodiment of the present disclosure.

FIG. 3 is a flowchart illustrating a method of SL-DRX adapted to a BS according to one embodiment of the present disclosure. In step S301, receiving a rejection of a sidelink service via one of a first signaling and a second signaling from a user equipment (UE), wherein the one of the first signaling and the second signaling is determined according to a cast type of the sidelink service. In step S302, in response to receiving the rejection, disabling a SL-DRX mechanism for the sidelink service.

Figure 4:
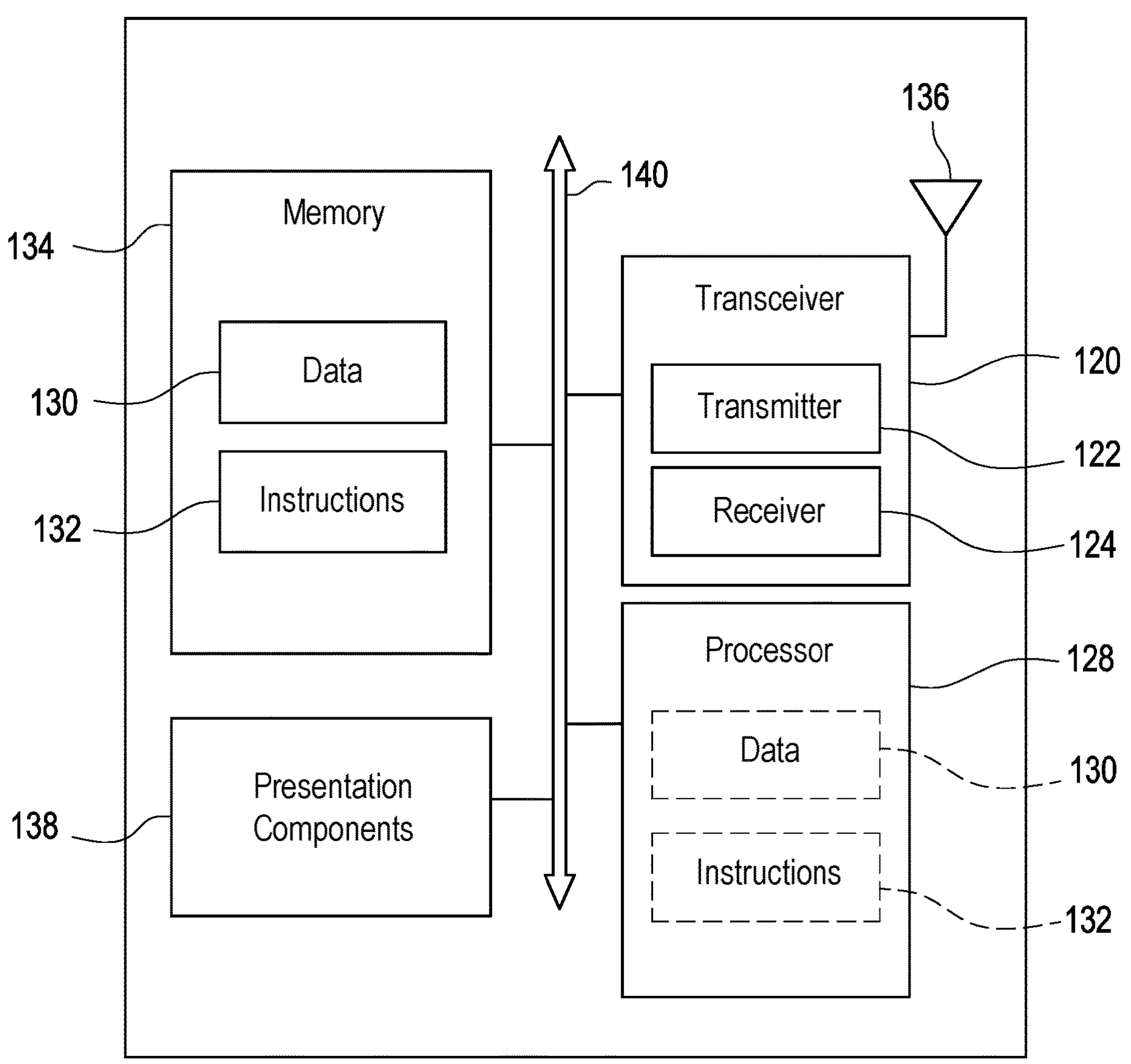
FIG. 4 is a block diagram illustrating a node for wireless communication according to one embodiment of the present disclosure.

FIG. 4 is a block diagram illustrating a node for wireless communication according to one embodiment of the present disclosure. As shown in FIG. 4, a node 100 may include a transceiver 120, a processor 128, a memory 134, one or more presentation components 138, and at least one antenna 136. The node 100 may also include an RF spectrum band module, a base station communications module, a network communications module, and a system communications management module, Input/Output (I/O) ports, I/O components, and power supply (not explicitly shown in FIG. 4). Each of these components may be in communication with each other, directly or indirectly, over one or more buses 140. In one implementation, the node 100 may be a UE or a base station that performs various functions described herein, for example, with reference to FIG. 1 through FIG. 3.

The transceiver 120 having a transmitter 122 (e.g., transmitting/transmission circuitry) and a receiver 124 (e.g., receiving/reception circuitry) may be configured to transmit and/or receive time and/or frequency resource partitioning information. In some implementations, the transceiver 120 may be configured to transmit in different types of subframes and slots including, but not limited to, usable, non-usable and flexibly usable subframes and slot formats. The transceiver 120 may be configured to receive data and control channels.

The node 100 may include a variety of computer-readable media. Computer-readable media can be any available media that can be accessed by the node 100 and include both volatile and non-volatile media, removable and non-removable media. By way of example, and not limitation, computer-readable media may comprise computer storage media and communication media. Computer storage media includes both volatile and non-volatile, removable and non-removable media implemented in any method or technology for storage of information such as computer-readable.

Computer storage media includes RAM, ROM, EEPROM, flash memory or other memory technology, CD- ROM, Digital Versatile Disks (DVD) or other optical disk storage, magnetic cassettes, magnetic tape, magnetic disk storage or other magnetic storage devices. Computer storage media does not comprise a propagated data signal. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 134 may include computer-storage media in the form of volatile and/or non-volatile memory. The memory 134 may be removable, non-removable, or a combination thereof. Exemplary memory includes solid-state memory, hard drives, optical-disc drives, and etc. As illustrated in FIG. 4, the memory 134 may store computer-readable, computer-executable instructions 132 (e.g., software codes) that are configured to, when executed, cause the processor 128 to perform various functions described herein, for example, with reference to FIG. 1 through FIG. 3. Alternatively, the instructions 132 may not be directly executable by the processor 128 but be configured to cause the node 100 (e.g., when compiled and executed) to perform various functions described herein.

The processor 128 (e.g., having processing circuitry) may include an intelligent hardware device, e.g., a Central Processing Unit (CPU), a microcontroller, an ASIC, and etc. The processor 128 may include memory. The processor 128 may process the data 130 and the instructions 132 received from the memory 134, and information through the transceiver 120, the base band communications module, and/or the network communications module. The processor 128 may also process information to be sent to the transceiver 120 for transmission through the antenna 136, to the network communications module for transmission to a core network.

One or more presentation components 138 presents data indications to a person or other device. Exemplary presentation components 138 include a display device, speaker, printing component, vibrating component, and etc.

Figure 5:
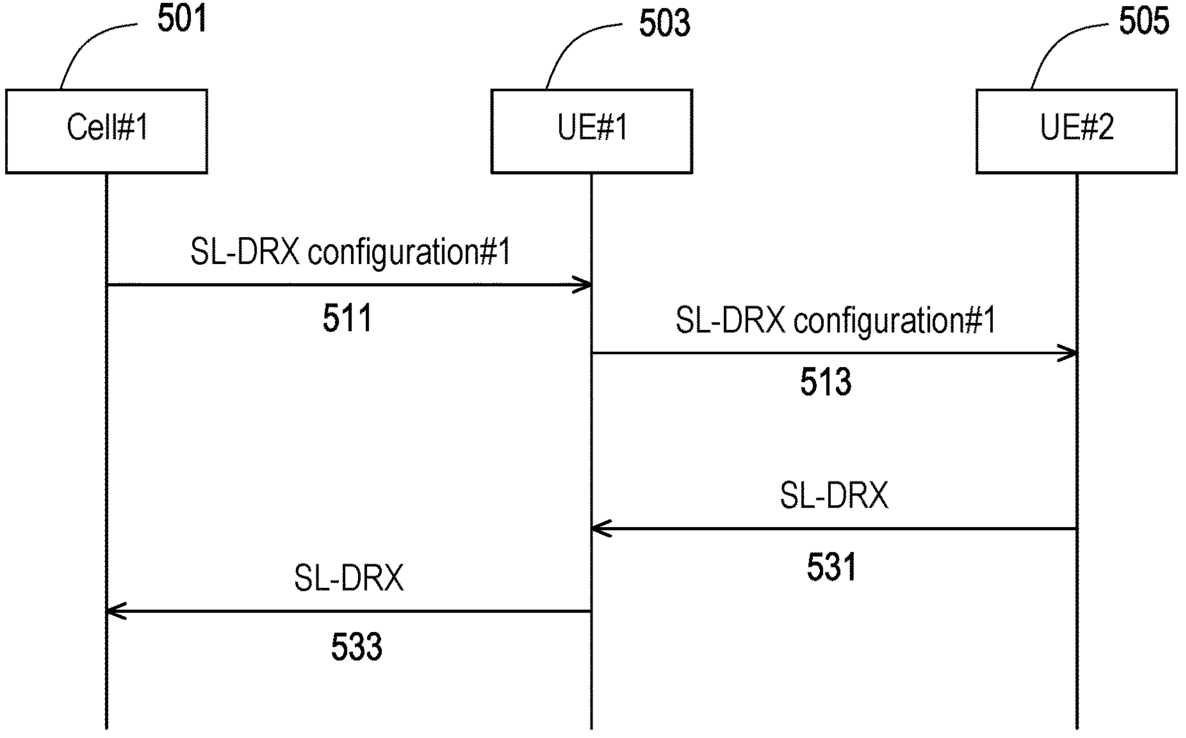
FIG. 5 is a schematic diagram illustrating a signaling flow of SL-DRX mechanism rejection procedure according to one embodiment of the present disclosure.

FIG. 5 is a schematic diagram illustrating a signaling flow of SL-DRX mechanism rejection procedure according to one embodiment of the present disclosure. FIG. 5 presents the signaling procedure for the UE#1 (i.e., UE 503) to reject one sidelink DRX configuration received from the Cell#1 (i.e., Cell 501). Firstly, UE#1 is implementing one sidelink unicast service associated with the UE#2 (i.e., UE 505), and the sidelink unicast service is configured with a sidelink (Layer-2) Destination ID, which may be configured by higher layers, e.g., application layers of the UE#1 or UE#2. For example, the UE#1 or UE#2 is implementing one sidelink unicast service, which is associated with one sidelink (Layer-2) Destination ID#1. In addition, the UE#1 and UE#2 may also be associated with a sidelink source (Layer-2) ID#1 and #2 respectively for sidelink control information exchange and sidelink packet transmission/reception.

In FIG. 5, the UE#1 may have report that the UE#1 is implementing one or more sidelink unicast/groupcast/broadcast services via one or more uplink UE-specific control signaling (e.g., via the information elements "sl-UE-AssistanceInformationNR" in the UEAssistanceInformation in 3GPP New Radio protocols). In some implementations, the UE#1 may implement one or more sidelink unicast/groupcast/broadcast services simultaneously and the UE#1 may report the information about all or a subset of the sidelink unicast/groupcast/broadcast services (e.g., UE#1 may report the sidelink services which may be manageable to the Cell#1 based on the frequency carriers that the serving RAN controls) to the Cell#1. After receiving the UE-specific control signaling from UE#1, in step 511, the Cell#1 may configure one or more sidelink DRX configurations to the UE#1 via downlink control signaling. In some implementations, the Cell#1 may configure/deliver the SL-DRX configurations via UE-specific control signaling (e.g., RRCReconfiguration message) to the UE#1. In some implementations, the Cell#1 may configure/deliver the SL-DRX configurations via common control signaling (e.g., group/common PDCCH or broadcasting system information). In some implementations, one sidelink service (e.g., a sidelink unicast/groupcast/broadcast service) may be associated with one specific SL-DRX configuration (in other words, one SL-DRX configuration may be configured to be associated with one sidelink (Layer-2) Destination ID). In some implementations, more than one sidelink (unicast/groupcast/broadcast) services may be associated with one specific SL-DRX configuration (in other words, one SL-DRX configuration may be configured to be associated with more than one sidelink (Layer-2) Destination ID). Accordingly, after receiving the SL-DRX configurations from Cell#1 in step 511, the UE#1 may prepare to implement the SL-DRX configuration for one specific sidelink unicast/groupcast/broadcast service. For example, the UE#1 may receive one SL-DRX configuration#1 in step 511. The SL-DRX configuration#1 is associated with the sidelink unicast service between the UE#1 and UE#2 (in other words, the SL-DRX configuration#1 is configured to be associated with the sidelink (Layer-2) Destination ID#1). Then, in step 513, the UE#1 may forward parameters of SL-DRX configuration#1 to the UE#2 via (LTE/NR) PC5 interface (e.g., via PC5 RRC signalings, such as RRCReconfigurationSidelink message). After receiving the SL-DRX configuration#1 at step 513, the UE#2 may have the right to decide whether to accept the SL-DRX configuration#1 received from the UE#1 (configured by the Cell#1) for sidelink control signaling and sidelink packet exchange between UE#1 and UE#2. If the UE#2 rejects the SL-DRX configuration#1, the UE#2 may reply a SL-DRX Reject message to the UE#1 (e.g., via a RRCReconfigurationComplete message transmission) in step 531. In addition, the UE#2 may consider SL-DRX mechanism is not applied for the sidelink unicast service between the UE#1 and UE#2. In contrast, the UE#2 may reply a RRCReconfigurationComplete message to the UE#1 without attaching the SL-DRX Reject message. In this condition, the UE#1 and UE#2 may implement the following sidelink control signaling (SCI) and sidelink packet exchange on the (LTE/NR) PC5 interface based on the SL-DRX configuration#1.

Back to the condition that the UE#2 replies SL-DRX Reject message to the UE#1 at step 531, after receiving the SL-DRX Reject message from the UE#2 (e.g., the SL-DRX Reject messaage#1 via (LTE/NR) PC5 interface), the UE#1 may transmit a SL-DRX Reject message#2 to the serving cell of UE#1 (i.e., Cell#1) to report to the serving RAN that SL-DRX mechanism is not applied between the UE#1 and UE#2.

It should be noted that, the signaling flow in FIG. 5 may be applicable to the SL-DRX mechanism for sidelink groupcast/broadcast service. Firstly, the Cell#1 may configure one SL-DRX configuration#2 to the UE#1 for one or more sidelink groupcast/broadcast services implemented by the UE#1 (e.g., via broadcasting system information or via UE-specific control signaling). In some implementations, the UE#1 may decide whether to implement SL-DRX configuration#2 for one associated sidelink groupcast service implemented by the UE#1 (e.g., based on Quality of Service (QoS) requirements of the sidelink groupcast service). Accordingly, in some implementations, the UE#1 may reply a SL-DRX indication (e.g., via the step 533) to indicate the SL-DRX configuration#2 (configured by Cell#1 via UE-specific control signaling or broadcasting system information for sidelink groupcast service) is not applied for the sidelink (Layer-2) destination identity associated with the concerned sidelink (unicast/groupcast/broadcast) service. Please also note, to each sidelink groupcast/broadcast service implemented by the UE#1, the UE#1 may decide whether SL-DRX configuration#2 is applied or not to each of the sidelink groupcast/broadcast service independently. In addition, UE#1 may also report the SL-DRX indication (to report that SL-DRX is/isn't applied to one sidelink (Layer-2) Destination ID) of each sidelink groupcast/broadcast service independently (in other words, UE#1 may report SL-DRX indication with sidelink (Layer-2) Destination ID of one concerned sidelink groupcast/broadcast service independently).

It should be noted that, in some implementations, the UE#1 may report the SL-DRX indication only while the serving RAN (e.g., Cell#1) has delivered SL-DRX configuration#2 to the UE#1 (e.g., a SL-DRX configuration specific for sidelink groupcast services). In some implementations, the UE#1 may be enabled to transmit SL-DRX indication no matter whether the serving RAN (e.g., Cell#1) has transmitted SL-DRX configuration for sidelink groupcast/broadcast service or not. It should be noted that, in the proposed mechanisms, the Cell#1, UE#1, or UE#2 may apply different approaches to report the condition that SL-DRX is not applied on one or more sidelink services based on the service type (e.g., sidelink unicast service/sidelink groupcast service/sidelink broadcast service) of the concerned sidelink service. For example, the SL-DRX indication approach may be implemented for a sidelink groupcast service and the SL-DRX Reject message transmission/reception may be implemented for a sidelink unicast service. In some implementations, the UE#1 may report a SL-DRX Reject message to the serving cell#1 in a UEAssistancelnformation message and the SL-DRX Reject event may be reported by UE#1 as a failure event for the sidelink unicast service/(NR) PC5 RRC connection between the UE#1/UE#2. In some implementations, the UE#2 may receive the SL-DRX configuration#1 along with other sidelink AS layer configurations to control the PC5 RRC connection between the UE#1 and UE#2. However, the rejection of SL-DRX#1 by UE#2 may not cause the UE#1 to report a AS layer configuration failure event (e.g., as a "ConfigFailure" event in the sidelink failure report for one or more PC5 RRC connections managed by the UE#1 or Cell#1) for the PC5 RRC connection between UE#1 and UE#2.

Vehicle-to-Everything (V2X) service is provided to support the information exchange between vehicles. In LTE (Long Term Evolution) protocols, V2X service could be supported in the air interface by Uu interface and PC5 interface. The PC5 interface covers the designs in Layer 2 and Layer 1 layers. The airlink interface on PC5 interface is also called sidelink in LTE protocols. LTE (Long Term Evolution) network supports sidelink operations since Re1.12. With sidelink (SL) operation, UEs can exchange data and control signaling directly without the relaying of base station (e.g., eNB in LTE network or gNB in NR network). For the convenience of description, all of the UEs in this disclosure are capable and authorized to access V2X service and the PC5 interface with neighbour UEs and RAN.

The V2X service could be further categorized based on different cast-types, such as:

Unicast: only two UEs in one sidelink group and the formulation of the sidelink group may be achieved in the Non-Access-Stratum (NAS layer).

Multi-cast (Groupcast): more than two UEs are grouped in one sidelink group to exchange sidelink packets with all other members in the sidelink group. In some implementations, sidelink groups may be formulated in Non-Access-Stratum (NAS) layer (e.g., V2X application layer or PC5-S protocols) or AS layer (e.g., Sidelink Radio Resource Control Layer signaling, PC5-RRC signaling).

Broadcast: No limitation to the sidelink group. A UE is able to broadcast message(s) and its neighbour UE(s) under the sidelink communication range could receive and decode the broadcasting message(s) successfully. In some implementations, the sidelink communication range may differ with Tx power, hardware sensitivity, etc.

To enable sidelink operation under the coverage of Radio Access Networks (e.g., E-UTRAN or NR-RAN), (LTE/NR) cells may provide SL configuration and SL resource allocation to UEs. To the UEs which is under the coverage of cellular networks, UEs need to perform sidelink operations based on the configuration of RANs. To enable sidelink operation under the coverage of a RAN, the serving cell (or camped cells) needs to provide SL configuration and SL resource allocation to UEs.

Two basic approaches are provided for SL resource allocation in LTE V2X service: scheduled resource allocation and UE autonomous resource selection from SL resource pools.

Scheduled resource allocation, characterized by:

The UE needs to be (LTE/NR) RRC_CONNECTED state in order to transmit data.

The UE requests SL resources from the eNB (by sending sidelink buffer status report to the serving cell). The eNB schedules dedicated sidelink resource for the UE to transmit sidelink control information and sidelink data. To achieve this, the eNB would request UE to report sidelink buffer status report through Uu interface. In addition, the UE may also trigger a Scheduling Request (SR) on uplink physical resource (e.g., PUCCH) or initiate random access procedure while the UE wants to transmit SL-BSR to the eNB but valid uplink resource is absent. Also note the SR resource (or configurations) and the SR procedure are common for both sidelink operations and uplink traffic.

UE autonomous resource selection from SL resource pools, characterized by:

UE autonomous resource selection could be applied to both RRC Connected UE (e.g., through dedicated RRC signaling or through system information broadcasting) and RRC inactive/idle state (e.g. through system information broadcasting).

Resource pool is a set of (virtually continuous) resource blocks and so UE could decide which physical resource blocks that the UE wants to apply for SL packet transmission autonomously.

The UE on its own selects resources from resource pools and performs transport format selection to transmit sidelink control information and data.

The UE may perform sensing for (re)selection of sidelink resources before SL packet delivery. Based on sensing results, the UE (re)selects some specific sidelink resources and reserves multiple sidelink resources. Up to 2 parallel (independent) resource reservation processes are allowed to be performed by the UE. The UE is also allowed to perform a single resource selection for its V2X sidelink transmission.

Also note, when the UE is out of coverage on the frequency used for V2X sidelink communication and if the eNB does not provide V2X sidelink configuration for that frequency, the UE may use a set of transmission and reception resource pools pre-configured in the UE. V2X sidelink communication resources may not be shared with other non-V2X data transmitted over sidelink. In some implementations, UE may obtain the pre-configuration through the installed USIM (UMTS Subscriber Identity Module), stored memory, or through RAN which the UE has been accessed earlier. Moreover, the UE may implement PC5 interface by synchronizing with GNSS (Global Navigation Satellite System) and applying pre-configuration. In this condition, we can see that the PC5 interface may be independent with RAN and (LTE/NR) Uu interface.

V2X Platoon scenario: in the platooning scenario, the Platoon X is composed of Vehicle A, Vehicle B, Vehicle C, and Vehicle D. There would be (at least) one scheduler (e.g., Vehicle A) in the platoon. In Platoon X, Vehicle A would configure sidelink resources to members in the same platoon through following approaches.

Mode 1-like approach: the scheduler would configure dynamic sidelink grants to members in the same platoon (e.g., dynamic sidelink grant through sidelink Control Information). In addition, the scheduler may also configure semi-periodic sidelink grant (e.g., configured sidelink grant) to the UE through sidelink control signalings (e.g., through Physical Sidelink Broadcast Channel, or sidelink Radio Resource Control (RRC) signaling). To achieve Mode 1-like approach, the scheduler would need UEs to provide feedback information through PC5 interface.

Mode 2-like approach: the scheduler would configure sidelink resource pools to members in the same platoon. The UEs would select sidelink grant by the UEs themselves automatically (e.g., sidelink grant selection w/wo sensing). The platoon scenario could be applied when the vehicles of the platoon is in-coverage (i.e., all of the vehicles in the platoon is under the coverage of cellular radio access network); out-of-coverage (i.e., all of the vehicles in the platoon is out of the coverage of cellular radio access network); or partial in-coverage (i.e., some of the UEs in the platoon is in-coverage and the other UEs in the platoon is out-of-coverage).

To support the scheduler, in this disclosure, the members in the Platoon may need to support the following progress to report their own statuses to the scheduler through PC5 interface: Sidelink Scheduling Request (SL-SR) configuration and report; Sidelink buffer status report (SL-BSR) configuration and report; or Sidelink power headroom report (SL-PHR) configuration and report.

Regarding PC5-RRC Connection and PC5-RRC signaling: the concept of PC5-RRC connection may be different with RRC Connection in Uu interface. In NR PC5 interface, one SL-unicast group (e.g., UE#1 and UE#2) may firstly need to build (at least) one PC5-S connection and each PC5-S connection may be associated one PC5-RRC connection in the Access Stratum layer (AS layer) independently. In other words, the PC5-S connection and PC5-RRC connection may be one-to-one mapping. Each PC5 RRC connection is a logical connection between a pair of source and destination Layer-2 IDs. In the service level, one PC5-S connection (and so the associated PC5-RRC connection) may be built to serve one or more than one V2X service. For example, the PC5-S connection#1s at the UE#1 andUE#2 are constructed to serve V2X service#1/#2 and the PC5-S connection#2s are constructed to serve V2X service #a/#b. It should be noted that, there may be multiple active PC5-S connections/PC5-RRC connections in the paired UEs to support different sets of V2X services which have different QoS requirements. In some embodiments, the UE may report the status of PC5-RRC connections to the serving cell (e.g., PCell in master cell group or PSCell in secondary cell group) and so the serving RAN may also know the conditions of PC5-RRC connections in the UE side. In addition, the UE may report the sidelink radio link failure event (to at least one PC5-RRC connection) to the serving RAN (e.g., for the reason of sidelink resource management such as Mode 1 sidelink resource configuration approach). It should be noted that, one UE may join multiple SL-unicast groups with different target UEs such that the UE may have PC5-RRC connections which are associated with different UEs.

From the above description, it is manifested that various techniques may be used for implementing the concepts described in the present application without departing from the scope of those concepts. Moreover, while the concepts have been described with specific reference to certain implementations, a person of ordinary skill in the art would recognize that changes may be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A method performed by a first user equipment (UE) for sidelink discontinuous reception (SL-DRX), the method comprising:

receiving an SL-DRX configuration of a sidelink service from a serving cell of the first UE;

rejecting the SL-DRX configuration of the sidelink service by:

transmitting, to the serving cell of the first UE, first signaling comprising an SL-DRX reject indication with a sidelink destination identity in a case that a cast type of the sidelink service is a sidelink unicast service, and transmitting, to the serving cell of the first UE, second signaling comprising a second SL-DRX indication with the sidelink destination identity in a case that the cast type of the sidelink service is a sidelink groupcast service, wherein:

the SL-DRX reject indication indicates a sidelink failure event associated with a PC5 radio resource control (RRC) connection between the first UE and a second UE, the second SL-DRX indication indicates that an SL-DRX mechanism has not been applied for the sidelink destination identity for the sidelink groupcast service, and the sidelink destination identity is associated with the sidelink service; and in response to rejecting the SL-DRX configuration, disabling the SL-DRX mechanism for the sidelink service and the sidelink destination identity.

2. The method of claim 1, further comprising:
transmitting sidelink control signaling to the second UE via the PC5 RRC connection established between the first UE and the second UE; and
receiving an SL-DRX reject message from the second UE after transmitting the sidelink control signaling,
wherein transmitting the first signaling comprises transmitting the first signaling to the serving cell after receiving the SL-DRX reject message.

3. The method of claim 2, wherein the SL-DRX reject message comprises an RRCReconfigurationCompletesidelink message, wherein the sidelink control signaling comprises an RRCReconfigurationsidelink message.

4. The method of claim 1, further comprising:
receiving a second SL-DRX configuration via one of broadcasting system information or UE-specific dedicated control signaling when the cast type is the sidelink groupcast service; and
applying the second SL-DRX configuration to a plurality of sidelink groupcast services implemented by the first UE.

5. The method of claim 1, further comprising:
receiving the SL-DRX configuration via UE-specific dedicated control signaling when the cast type is the sidelink unicast service.

6. A first user equipment (UE), comprising:
at least one processor; and
at least one non-transitory computer-readable medium coupled to the at least one processor and storing one or more computer-executable instructions that, when executed by the at least one processor, cause the first UE to:
receive an SL-DRX configuration of a sidelink service from a serving cell of the first UE;
reject the SL-DRX configuration of the sidelink service by:
transmitting, to the serving cell of the first UE, first signaling comprising an SL-DRX reject indication with a sidelink destination identity in a case that a cast type of the sidelink service is a sidelink unicast service, and
transmitting, to the serving cell of the first UE, second signaling comprising a second SL-DRX indication with the sidelink destination identity in a case that the cast type of the sidelink service is a sidelink groupcast service, wherein:
the SL-DRX reject indication indicates a sidelink failure event associated with a PC5 radio resource control (RRC) connection between the first UE and a second UE,
the second SL-DRX indication indicates that an SL-DRX mechanism has not been applied for the sidelink destination identity for the sidelink groupcast service, and
the sidelink destination identity is associated with the sidelink service; and
in response to rejecting the SL-DRX configuration, disable the SL-DRX mechanism for the sidelink service and the sidelink destination identity.

7. The first UE of claim 6, wherein the one or more computer-executable instructions, when executed by the at least one processor, further cause the first UE to:
transmit sidelink control signaling to the second UE via the PC5 RRC connection established between the first UE and the second UE; and
receive an SL-DRX reject message from the second UE after transmitting the sidelink control signaling,
wherein transmitting the first signaling comprises transmitting the first signaling to the serving cell after receiving the SL-DRX reject message.

8. The first UE of claim 7, wherein the SL-DRX reject message comprises an RRCReconfigurationCompletesidelink message, wherein the sidelink control signaling comprises an RRCReconfigurationsidelink message.

9. The first UE of claim 6, wherein the one or more computer-executable instructions, when executed by the at least one processor, further cause the first UE to:
receive a second SL-DRX configuration via one of broadcasting system information or UE-specific dedicated control signaling when the cast type is the sidelink groupcast service; and
apply the second SL-DRX configuration to a plurality of sidelink groupcast services implemented by the first UE.

10. The first UE of claim 6, wherein the one or more computer-executable instructions, when executed by the at least one processor, further cause the first UE to:
receive the SL-DRX configuration via UE-specific dedicated control signaling when the cast type is the sidelink unicast service.

11. A method performed by a base station for sidelink discontinuous reception (SL-DRX), the method comprising:
transmitting an SL-DRX configuration of a sidelink service to a user equipment (UE);
receiving, from the UE, a rejection of the SL-DRX configuration of the sidelink service via:
receiving first signaling comprising an SL-DRX reject indication from the UE, wherein the first signaling is determined in a case that a cast type of the sidelink service is a sidelink unicast service, and
receiving second signaling comprising a second SL-DRX indication from the UE, wherein the second signaling is determined in a case that the cast type of the sidelink service is a sidelink groupcast service, wherein:
the SL-DRX reject indication indicates a sidelink failure event associated with a PC5 radio resource control (RRC) connection between the UE and a second UE, and
the second SL-DRX indication indicates that an SL-DRX mechanism has not been applied for the sidelink groupcast service; and
in response to receiving the rejection of the SL-DRX configuration of the sidelink service, disabling an SL-DRX mechanism for the sidelink service.

* * * * *